(12) United States Patent
Murayama et al.

(10) Patent No.: US 10,731,588 B2
(45) Date of Patent: *Aug. 4, 2020

(54) CONTROL APPARATUS FOR EXHAUST GAS SENSOR

(71) Applicant: DENSO CORPORATION, Kariya, Aichi-pref. (JP)

(72) Inventors: Yuki Murayama, Kariya (JP); Fumiya Nagata, Obu (JP)

(73) Assignee: DENSO CORPORATION, Kariya (JP)

( * ) Notice: Subject to any disclaimer, the term of this patent is extended or adjusted under 35 U.S.C. 154(b) by 6 days.

This patent is subject to a terminal disclaimer.

(21) Appl. No.: 16/178,858

(22) Filed: Nov. 2, 2018

(65) Prior Publication Data

US 2019/0136785 A1 May 9, 2019

(30) Foreign Application Priority Data

Nov. 7, 2017 (JP) .................. 2017-214762

(51) Int. Cl.
*F02D 41/22* (2006.01)
*F01N 11/00* (2006.01)
(Continued)

(52) U.S. Cl.
CPC .......... *F02D 41/222* (2013.01); *F01N 11/002* (2013.01); *F01N 11/007* (2013.01); *F02D 41/146* (2013.01); *F02D 41/1494* (2013.01); *F01N 13/008* (2013.01); *F01N 2550/00* (2013.01); *F01N 2560/026* (2013.01);
(Continued)

(58) Field of Classification Search
CPC .... F01N 11/002; F01N 11/007; F01N 13/008; F01N 2550/00; F01N 2560/026; F01N 2560/06; F01N 2900/0416; F01N 2900/1402; F02D 41/146; F02D 41/1494; F02D 41/222

See application file for complete search history.

(56) References Cited

U.S. PATENT DOCUMENTS

| 2002/0162743 | A1* | 11/2002 | Inagaki | G01N 27/4065 204/425 |
| 2015/0377822 | A1* | 12/2015 | Yoshida | G01N 27/419 205/784 |
| 2017/0184536 | A1 | 6/2017 | Kawamoto et al. | |

FOREIGN PATENT DOCUMENTS

| JP | 2015-059926 | 3/2015 |
| JP | 2018-204985 | 12/2018 |

* cited by examiner

*Primary Examiner* — Brandon D Lee
(74) *Attorney, Agent, or Firm* — Nixon & Vanderhye P.C.

(57) ABSTRACT

A control apparatus is provided for controlling an exhaust gas sensor. The exhaust gas sensor includes a first cell, a second cell configured to output electric current depending on the concentration of a measurement target component in exhaust gas from which oxygen has been removed by the first cell, and a heater configured to heat the first and second cells. The control apparatus includes a heater controlling unit, a current detecting unit configured to detect the electric current outputted from the second cell, and a deterioration determining unit. The deterioration determining unit causes the heater controlling unit to change output of the heater and thereby changes the temperature of the first cell. During the change in the output of the heater, the deterioration determining unit determines, based on an amount of change in the electric current detected by the current detecting unit, whether or not the second cell is deteriorated.

10 Claims, 14 Drawing Sheets

(51) Int. Cl.
*F02D 41/14* (2006.01)
*F01N 13/00* (2010.01)
(52) U.S. Cl.
CPC .. *F01N 2560/06* (2013.01); *F01N 2900/0416* (2013.01); *F01N 2900/1402* (2013.01)

CONTROL APPARATUS FOR EXHAUST GAS SENSOR

CROSS-REFERENCE TO RELATED APPLICATION

This application is based on and claims priority from Japanese Patent Application No. 2017-214762 filed on Nov. 7, 2017, the contents of which are hereby incorporated by reference in their entirety into this application.

BACKGROUND

1 Technical Field

The present disclosure relates to control apparatuses for exhaust gas sensors.

2 Description of Related Art

In exhaust pipes of vehicles equipped with internal combustion engines, there are provided exhaust gas sensors to measure the concentration of a specific gas (e.g., nitrogen oxides) contained in the exhaust gas. As such exhaust gas sensors, there are known those which include a plurality of cells each having a pair of electrodes formed respectively on opposite sides of a solid electrolyte layer. Each of the cells outputs, upon application of a voltage between the pair of electrodes of the cell, electric current whose amplitude depends on the concentration of a measurement target component.

For example, Japanese Patent Application Publication No. JP2015059926A discloses an exhaust gas sensor which includes a pump cell and a sensor cell. The pump cell is provided to remove oxygen from the exhaust gas. The sensor cell is provided downstream of the pump cell to detect the concentration of nitrogen oxides in the exhaust gas from which oxygen has been removed by the pump cell. Consequently, by removing in advance oxygen which is contained more than nitrogen oxides in the exhaust gas, it is possible to accurately measure the concentration of nitrogen oxides.

On the other hand, in exhaust gas sensors which include a plurality of cells, the relationships between the concentrations of the measurement target components and the output currents of the cells may be changed due to deterioration of the cells.

In view of the above, a control apparatus disclosed in the above patent document is configured to determine whether or not the sensor cell of the exhaust gas sensor is deteriorated. Specifically, the control apparatus is configured to: 1) temporarily lower the voltage applied to the pump cell, thereby intentionally increasing the amount of oxygen flowing through the pump cell to reach the sensor cell; and 2) determine whether or not the sensor cell is deteriorated on the basis of the amount of increase in the output current of the sensor cell during the lowering of the voltage applied to the pump cell.

However, in the above exhaust gas sensor, each cell has, as a capacitor, a capacitance component. Therefore, when the voltage applied to the pump cell is changed for the deterioration determination of the sensor cell, electric charge stored in the pump cell is released from the pump cell. That is, capacitive discharge of the pump cell takes place. Consequently, under the influence of the capacitive discharge, the output current of the sensor cell fluctuates so that it takes a relatively long time for the output current of the sensor cell to settle at a constant value. As a result, it takes a relatively long time for the control apparatus to make the deterioration determination on the basis of the amount of increase in the output current of the sensor cell.

Moreover, when the time required for the control apparatus to make the deterioration determination of the sensor cell is long, the concentration of nitrogen oxides and/or the concentration of oxygen in the exhaust gas reaching the exhaust gas sensor may change during the deterioration determination of the sensor cell. Consequently, due to the change in the concentration of nitrogen oxides and/or the concentration of oxygen in the exhaust gas reaching the exhaust gas sensor, the output current of the sensor cell would be changed, thereby lowering the accuracy of the deterioration determination.

SUMMARY

According to the present disclosure, there is provided a control apparatus for an exhaust gas sensor. The exhaust gas sensor includes: a first cell configured to remove oxygen from exhaust gas of an internal combustion engine; a second cell configured to output electric current depending on the concentration of a measurement target component in the exhaust gas from which oxygen has been removed by the first cell; and a heater configured to heat both the first and second cells. The control apparatus includes: a heater controlling unit configured to control the output of the heater; a current detecting unit configured to detect the electric current outputted from the second cell; and a deterioration determining unit. The deterioration determining unit is configured to: 1) cause the heater controlling unit to change the output of the heater and thereby change the temperature of the first cell; and 2) determine, during the change in the output of the heater, whether or not the second cell is deteriorated on the basis of an amount of change in the electric current outputted from the second cell and detected by the current detecting unit.

In the control apparatus with the above configuration, in determining whether or not the second cell is deteriorated, the deterioration determining unit causes the heater controlling unit to change the output of the heater and thereby changes the temperature of the first cell. Consequently, the performance of the first cell removing oxygen from the exhaust gas is changed, causing the amount of oxygen flowing through the first cell to reach the second cell to change. During the change in the output of the heater, the deterioration determining unit determines whether or not the second cell is deteriorated on the basis of the amount of change in the electric current outputted from the second cell and detected by the current detecting unit.

That is, in the control apparatus according to the present disclosure, in changing the performance of the first cell removing oxygen from the exhaust gas, the deterioration determining unit changes the temperature of the first cell, not a voltage applied to the first cell. Consequently, occurrence of capacitive discharge of the first cell is suppressed, allowing the electric current outputted from the second cell to become substantially constant in a relatively short time. As a result, the deterioration determining unit can accurately make the deterioration determination in a short time on the basis of the amount of change in the electric current outputted from the second cell.

DESCRIPTION OF EMBODIMENTS

Figure 1:
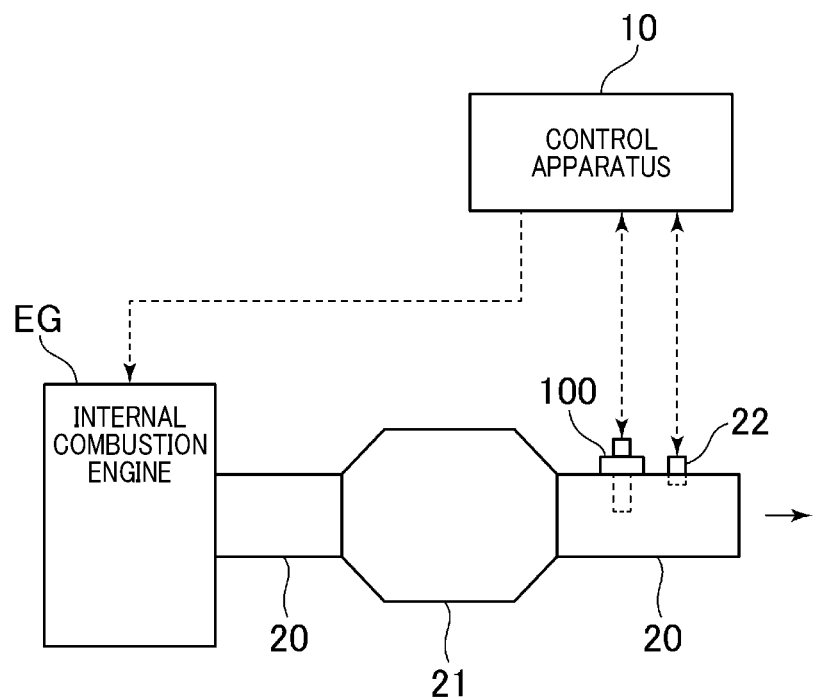
FIG. 1 is a schematic diagram illustrating the configuration of an exhaust system of a vehicle, the exhaust system having both an exhaust gas sensor and a control apparatus according to a first embodiment provided therein.

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the configuration of an exhaust system of a vehicle; in the exhaust system, there are provided both an exhaust gas sensor 100 and a control apparatus 10 according to the first embodiment.

Specifically, as shown in FIG. 1, in the exhaust system, to an internal combustion engine EG of the vehicle, there is connected an exhaust pipe 20 to guide exhaust gas from the internal combustion engine EG to the outside of the vehicle. The exhaust gas sensor 100 is mounted to the exhaust pipe 20 to measure (or detect) the concentration of nitrogen oxides contained in the exhaust gas. The control apparatus 10 according to the present embodiment is provided to control the exhaust gas sensor 100.

Moreover, as shown in FIG. 1, in the exhaust pipe 20, there is arranged an exhaust gas purifying apparatus 21. The exhaust gas purifying apparatus 21 is configured to convert harmful components of the exhaust gas (e.g., nitrogen oxides and carbon monoxide) into harmless components (e.g., nitrogen, water and carbon dioxide) using a catalyst. In the exhaust system, the exhaust gas sensor 100 is provided downstream of the exhaust gas purifying apparatus 21.

In addition, in the exhaust system, there may be further provided an additional exhaust gas sensor 100 upstream of the exhaust gas purifying apparatus 21. Moreover, in the exhaust pipe 20, there may be arranged a plurality of exhaust gas purifying apparatuses 21. That is, the locations and numbers of the exhaust gas sensors 100 and exhaust gas purifying apparatuses 21 are not particularly limited.

The concentration of nitrogen oxides measured by the exhaust gas sensor 100 is inputted to the control apparatus 10. Then, based on the measured concentration of nitrogen oxides, the control apparatus 10 performs various controls of the internal combustion engine EG. These controls include, for example, control of a fuel injection quantity and fuel injection timing in the internal combustion engine EG.

As above, the control apparatus 10 according to the present embodiment performs various controls of the internal combustion engine EG as well as control of the exhaust gas sensor 100 which will be described later. That is, the control apparatus 10 according to the present embodiment is configured as a so-called engine ECU (Electronic Control Unit).

It should be noted that the control apparatus 10 may alternatively be configured as a dedicated apparatus for controlling the exhaust gas sensor 100. In this case, the control apparatus 10 may communicate with an engine ECU, which is provided separately from the control apparatus 10, to provide information necessary for the engine ECU to perform various controls of the internal combustion engine EG.

As shown in FIG. 1, to the exhaust pipe 20, there is also mounted a gas temperature sensor 22 so as to be located close to and downstream of the exhaust gas sensor 100. The gas temperature sensor 22 is configured to measure (or detect) the temperature of the exhaust gas flowing through the exhaust pipe 20. The temperature of the exhaust gas measured by the gas temperature sensor 22 is inputted to the control apparatus 10. In addition, in the present embodiment, the gas temperature sensor 22 is implemented by, for example, a thermistor.

Next, the configuration of the exhaust gas sensor 100 will be described in detail with reference to FIGS. 2-5.

Figure 2:
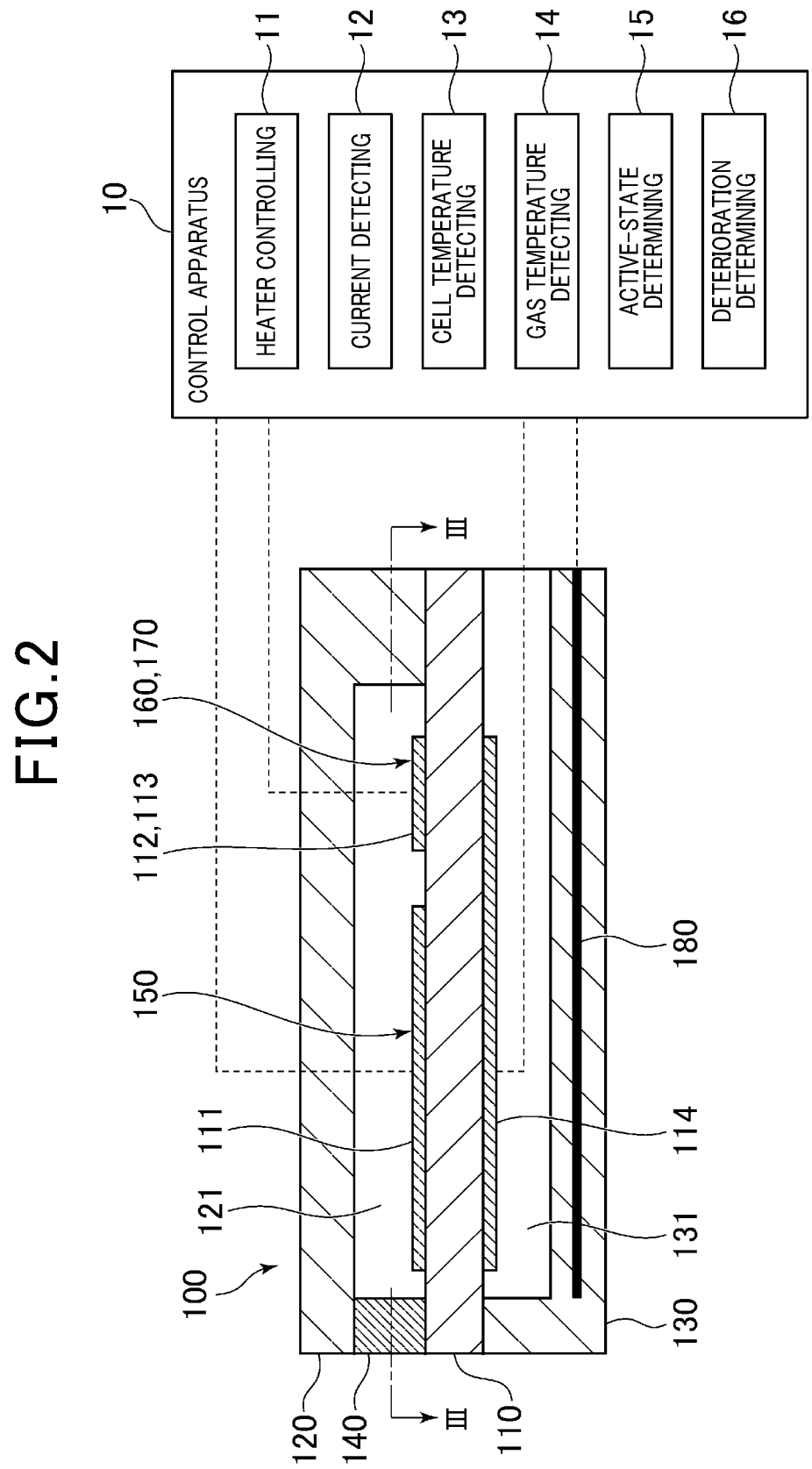
FIG. 2 is a schematic diagram illustrating both the configuration of the exhaust gas sensor and the configuration of the control apparatus according to the first embodiment.

It should be noted that: a cross section of that part of the exhaust gas sensor 100 which is located inside the exhaust pipe 20 is shown in FIG. 2; and the left end of the exhaust gas sensor 100 in FIG. 2 corresponds to a distal end of the exhaust gas sensor 100 which protrudes inside the exhaust pipe 20.

The exhaust gas sensor 100 includes a solid electrolyte body 110 and main bodies 120 and 130.

The solid electrolyte body 110 is plate-shaped and formed of a solid electrolyte material such as zirconia. The solid electrolyte body 110 has oxygen ion conductivity in an active state of a predetermined temperature or higher. On the solid electrolyte body 110, there are formed a plurality of cells, i.e., a pump cell 150, a sensor cell 160 and a monitor cell 170 which will be described later.

Each of the main bodies 120 and 130 is plate-shaped and formed of an insulating material whose main component is alumina. The main bodies 120 and 130 are arranged to have the solid electrolyte body 110 sandwiched therebetween. That is, the main body 120 is arranged on one side (i.e., the upper side in FIG. 2) of the solid electrolyte body 110 while the main body 130 is arranged on the other side (i.e., the lower side in FIG. 2) of the solid electrolyte body 110.

Part of a solid electrolyte body 110-side surface of the main body 120 is recessed toward the opposite side to the solid electrolyte body 110, forming a hollow space between the main body 120 and the solid electrolyte body 110. The hollow space constitutes a measurement chamber 121 into which the exhaust gas is introduced as a measurement target.

At the distal end of the exhaust gas sensor 100, there is arranged a diffusion resistor 140 via which the measurement chamber 121 is open to the outside of the exhaust gas sensor 100 (or the inside of the exhaust pipe 20). The diffusion resistor 140 is formed of a porous ceramic material (or ceramic material having pores formed therein) such as alumina. By the diffusion resistor 140, the flow rate of the exhaust gas drawn into the measurement chamber 121 is regulated. The exhaust gas, which has flowed into the measurement chamber 121 via the diffusion resistor 140, is then supplied to the pump cell 150, the sensor cell 160 and the monitor cell 170.

On the other hand, part of a solid electrolyte body 110-side surface of the main body 130 is recessed toward the opposite side to the solid electrolyte body 110, forming a hollow space between the main body 130 and the solid electrolyte body 110. Though not shown in the figures, the hollow space is open to the atmosphere outside the exhaust pipe 20. That is, the hollow space constitutes an atmospheric air chamber 131 into which atmospheric air is introduced.

On a surface of the solid electrolyte body 110 facing the measurement chamber 121, there are formed a pump electrode 111, a sensor electrode 112 and a monitor electrode 113. Specifically, the pump electrode 111 is formed close to the diffusion resistor 140. Both the sensor electrode 112 and the monitor electrode 113 are formed on the opposite side of the pump electrode 111 to the diffusion resistor 140. Moreover, the sensor electrode 112 and the monitor electrode 113 are aligned with each other in a direction perpendicular to the paper surface of FIG. 2 (see FIG. 3).

Both the pump electrode 111 and the monitor electrode 113 are formed of, for example, a Pt—Au alloy (i.e., a platinum-gold alloy) and active to oxygen but inactive to nitrogen oxides. On the other hand, the sensor electrode 112 is formed of a noble metal, such as Pt (platinum) or Rh (rhodium), and active to both oxygen and nitrogen oxides.

On a surface of the solid electrolyte body 110 facing the atmospheric air chamber 131, there is formed a common electrode 114. Specifically, the common electrode 114 is formed so that when viewed along the direction perpendicular to the surface of the solid electrolyte body 110 (or the direction perpendicular to the paper surface of FIG. 3), the common electrode 114 overlaps all of the pump electrode 111, the sensor electrode 112 and the monitor electrode 113. The common electrode 114 is formed of, for example, a metal material whose main component is Pt.

When the solid electrolyte body 110 is in a high-temperature active state, upon application of a voltage between the pump electrode 111 and the common electrode 114, oxygen contained in the exhaust gas in the measurement chamber 121 is decomposed at the pump electrode 111 to produce oxygen ions; the oxygen ions are then discharged to the atmospheric air chamber 131 through the solid electrolyte body 110. Consequently, oxygen is partially removed from the exhaust gas in the measurement chamber 121. That is, the pump electrode 111, the common electrode 114 and that part of the solid electrolyte body 110 which is sandwiched between the pump electrode 111 and the common electrode 114 together constitute the pump cell 150 that functions to partially remove oxygen contained in the exhaust gas in the measurement chamber 121. In addition, the pump cell 150 corresponds to a first cell of the exhaust gas sensor 100.

Moreover, when the solid electrolyte body 110 is in the high-temperature active state, upon application of a voltage between the sensor electrode 112 and the common electrode 114, both oxygen and nitrogen oxides contained in the exhaust gas, from which oxygen has been partially removed by the pump cell 150, are decomposed at the sensor electrode 112 to produce oxygen ions; the oxygen ions are then discharged to the atmospheric air chamber 131 through the solid electrolyte body 110. Consequently, between the sensor electrode 112 and the common electrode 114, there flows electric current whose amplitude depends on both the concentration of oxygen and the concentration of nitrogen oxides in the exhaust gas from which oxygen has been partially removed by the pump cell 150. In addition, the value of the electric current flowing between the sensor electrode 112 and the common electrode 114 is acquired by the control apparatus 10.

That is, the sensor electrode 112, the common electrode 114 and that part of the solid electrolyte body 110 which is sandwiched between the sensor electrode 112 and the common electrode 114 together constitute the sensor cell 160 that functions to output electric current whose amplitude depends on the concentrations of measurement target components (i.e., nitrogen oxides and oxygen) in the exhaust gas from which oxygen has been partially removed by the pump cell 150. In addition, the sensor cell 160 corresponds to a second cell of the exhaust gas sensor 100.

Furthermore, when the solid electrolyte body 110 is in the high-temperature active state, upon application of a voltage between the monitor electrode 113 and the common electrode 114, oxygen contained in the exhaust gas, from which oxygen has been partially removed by the pump cell 150, is decomposed at the monitor electrode 113 to produce oxygen ions; the oxygen ions are then discharged to the atmospheric air chamber 131 through the solid electrolyte body 110. Consequently, between the monitor electrode 113 and the common electrode 114, there flows electric current whose amplitude depends on the concentration of oxygen in the exhaust gas from which oxygen has been partially removed by the pump cell 150. In addition, the value of the electric current flowing between the monitor electrode 113 and the common electrode 114 is also acquired by the control apparatus 10.

That is, the monitor electrode 113, the common electrode 114 and that part of the solid electrolyte body 110 which is sandwiched between the monitor electrode 113 and the common electrode 114 together constitute the monitor cell 170 that functions to output electric current whose amplitude depends on the concentration of oxygen in the exhaust gas from which oxygen has been partially removed by the pump cell 150. In addition, the monitor cell 170 corresponds to another second cell of the exhaust gas sensor 100.

Figure 4:
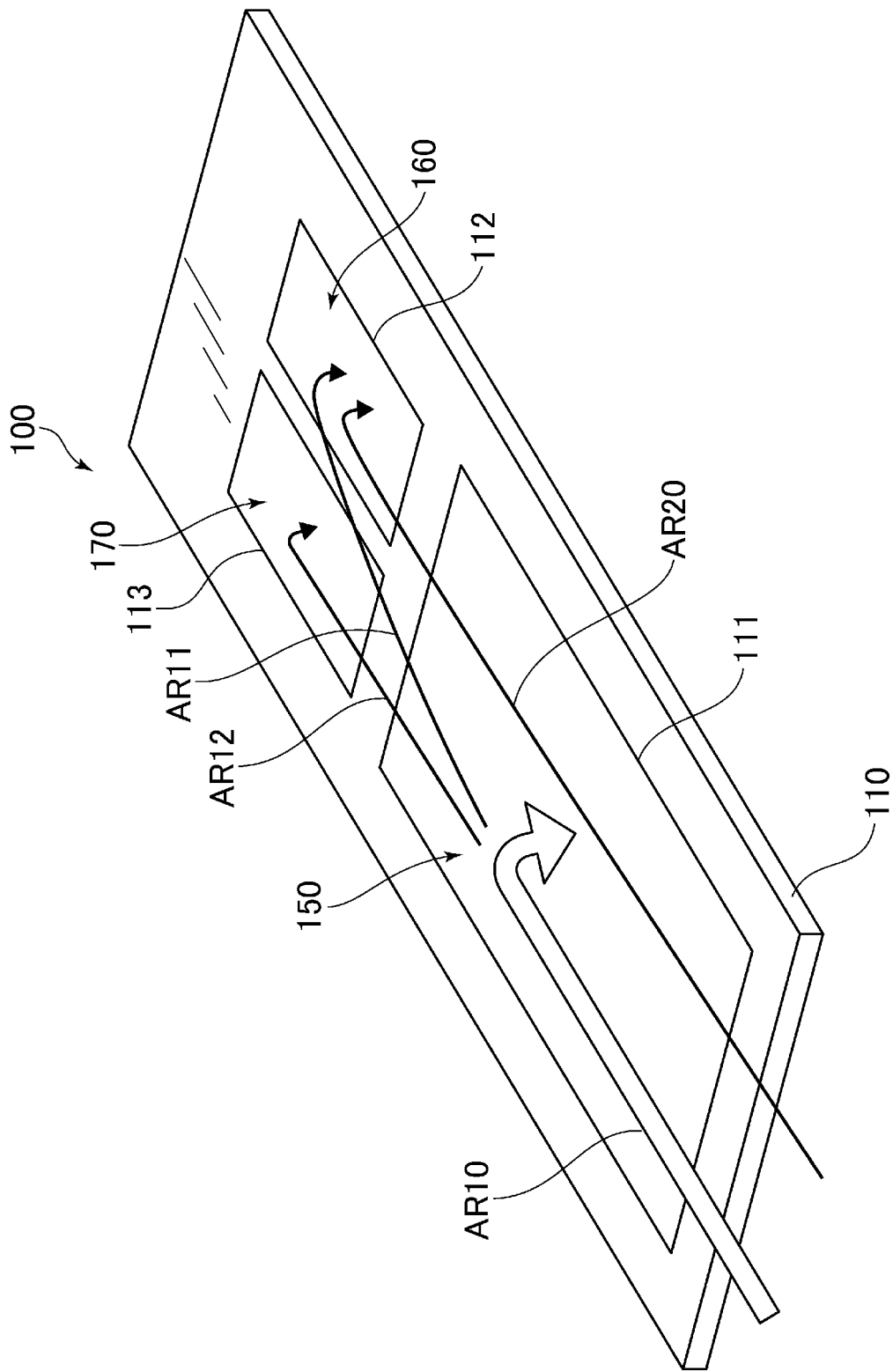
FIG. 4 is a schematic diagram illustrating the measurement principle of the exhaust gas sensor.

As shown in FIG. 4, the exhaust gas, which has flowed into the measurement chamber 121 via the diffusion resistor 140, flows through the pump cell 150 to the sensor cell 160 and the monitor cell 170.

Specifically, in FIG. 4, the arrow AR10 indicates the flow of oxygen which flows into the measurement chamber 121 via the diffusion resistor 140 and is then removed from the measurement chamber 121 by the pump cell 150. Most of oxygen contained in the exhaust gas, which has flowed into the measurement chamber 121 via the diffusion resistor 140, is removed by the pump cell 150. However, it is difficult for the pump cell 150 to remove all of oxygen contained in the exhaust gas.

Consequently, a slight amount of oxygen flows to each of the sensor cell 160 and the monitor cell 170 without being removed by the pump cell 150. In FIG. 4, the arrow AR11 indicates the flow of oxygen which flows through the pump cell 150 to reach the sensor cell 160; the arrow AR12 indicates the flow of oxygen which flows through the pump cell 150 to reach the monitor cell 170.

Moreover, as described previously, both the pump electrode 111 and the monitor electrode 113 are inactive to nitrogen oxides. Therefore, nitrogen oxides contained in the exhaust gas, which has flowed into the measurement chamber 121 via the diffusion resistor 140, are removable neither by the pump cell 150 nor by the monitor cell 170. Consequently, nitrogen oxides contained in the exhaust gas flow to the sensor cell 160 without being removed by the pump cell 150. In FIG. 4, the arrow AR20 indicates the flow of nitrogen oxides which flow through the pump cell 150 to reach the sensor electrode 112 of the sensor cell 160.

As shown in FIG. 4, both nitrogen oxides (see the arrow AR20) and residual oxygen (see the arrow AR11) reach the sensor cell 160. Therefore, the amplitude of the output current of the sensor cell 160 depends on both the concentration of nitrogen oxides and the concentration of oxygen in the exhaust gas from which oxygen has been partially removed by the pump cell 150.

On the other hand, only residual oxygen (see the arrow AR12) reaches the monitor cell 170. Therefore, the amplitude of the output current of the monitor cell 170 depends on only the concentration of oxygen in the exhaust gas from which oxygen has been partially removed by the pump cell 150.

Accordingly, the electric current value obtained by subtracting the output current of the monitor cell 170 from the output current of the sensor cell 160 depends on only the concentration of nitrogen oxides in the exhaust gas. In other words, the electric current value represents the concentration of nitrogen oxides in the exhaust gas.

In view of the above, in the present embodiment, the control apparatus 10 determines the concentration of nitrogen oxides in the exhaust gas on the basis of the electric current value obtained by subtracting the output current of the monitor cell 170 from the output current of the sensor cell 160.

Consequently, with the above configuration of the exhaust gas sensor 100, it is possible to accurately measure the concentration of nitrogen oxides in the exhaust gas without being affected by oxygen contained in the exhaust gas.

As shown in FIG. 2, in the main body 130, there is embedded a heater 180. The heater 180 is configured to generate heat in the main body 130, thereby heating the pump cell 150, the sensor cell 160 and the monitor cell 170. The solid electrolyte body 110 is heated by the heater 180, thereby being kept in the high-temperature active state. The output of the heater 180 (i.e., the amount of heat generated by the heater 180) is controlled by the control apparatus 10.

Figure 3:
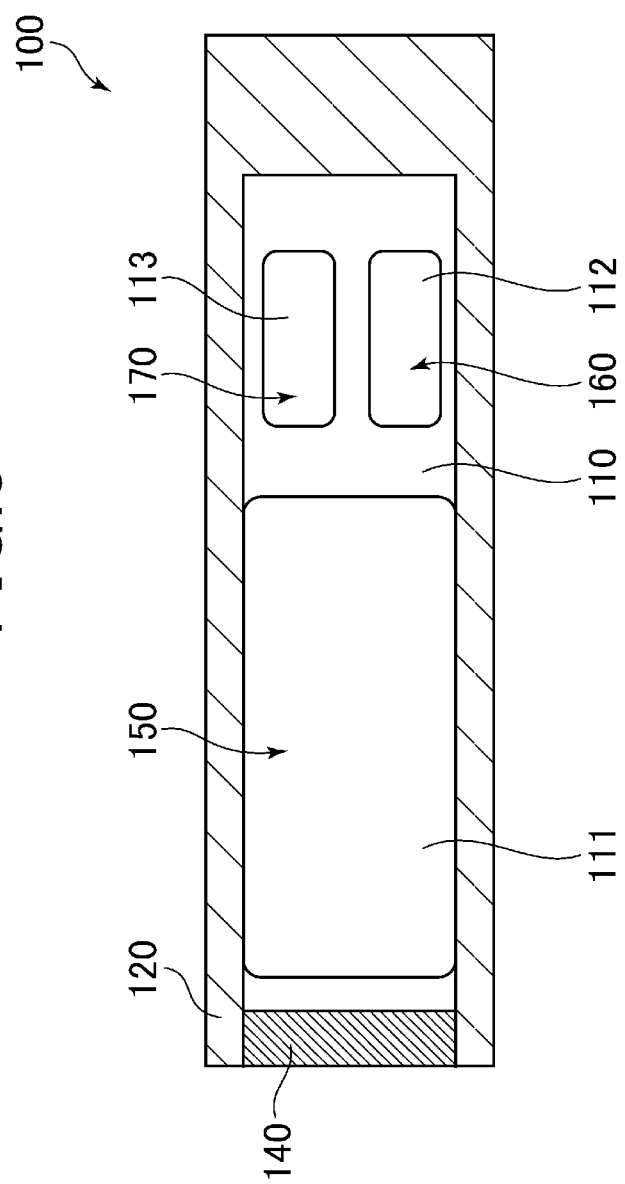
FIG. 3 is a cross-sectional view taken along the line in FIG. 2.
Figure 5:
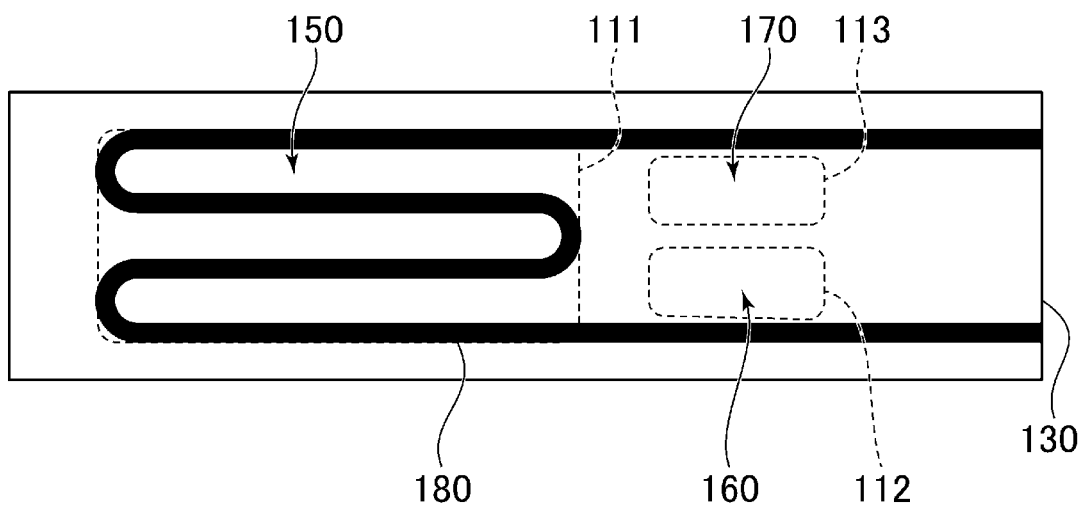
FIG. 5 is a schematic diagram illustrating the arrangement of a heater in the exhaust gas sensor.

FIG. 5 is a schematic diagram, along the direction perpendicular to the paper surface of FIG. 3, illustrating the arrangement of the heater 180 in the exhaust gas sensor 100.

As shown in FIG. 5, in the present embodiment, the heater 180 is formed in such a pattern as to mainly heat the pump cell 150 among the three cells 150-170.

Next, the configuration of the control apparatus 10 according to the present embodiment will be described with reference to FIG. 2.

The control apparatus 10 is configured as a computer system which includes a CPU (Central Processing Unit), a ROM (Read Only Memory), a RAM (Random Access Memory) and I/O (Input/Output) interfaces.

As shown in FIG. 2, in the present embodiment, the control apparatus 10 includes, as functional control blocks, a heater controlling unit 11, a current detecting unit 12, a cell temperature detecting unit 13, a gas temperature detecting unit 14, an active-state determining unit 15 and a deterioration determining unit 16.

The heater controlling unit 11 controls the output of the heater 180 (i.e., the heat generated by and outputted from heater 180). Specifically, in the present embodiment, the heater controlling unit 11 controls the output of the heater 180 by controlling the duty cycle of electric current supplied to the heater 180. More specifically, the heater controlling unit 11 controls the output of the heater 180 so as to keep the temperature of the pump cell 150 detected by the cell temperature detecting unit 13 at a suitable temperature and thereby keep the solid electrolyte body 110 in the active state.

The current detecting unit 12 detects the electric current outputted from the sensor cell 160. Specifically, the current detecting unit 12 applies a predetermined voltage between the sensor electrode 112 and the common electrode 114 of the sensor cell 160 and detects the electric current flowing between the two electrodes 112 and 114 under the predetermined voltage. Hereinafter, the electric current will be simply referred to as the "sensor cell current Is".

Moreover, the current detecting unit 12 also detects the electric current outputted from the monitor cell 170. Specifically, the current detecting unit 12 applies a predetermined voltage between the monitor electrode 113 and the common electrode 114 of the monitor cell 170 and detects the electric current flowing between the two electrodes 113 and 114 under the predetermined voltage. Hereinafter, the electric current will be simply referred to as the "monitor cell current Im".

Furthermore, the current detecting unit 12 also detects the electric current outputted from the pump cell 150. Specifically, the current detecting unit 12 applies a predetermined voltage between the pump electrode 111 and the common electrode 114 of the pump cell 150 and detects the electric current flowing between the two electrodes 111 and 114 under the predetermined voltage. Hereinafter, the electric current will be simply referred to as the "pump cell current Ip"; the predetermined voltage applied between the pump electrode 111 and the common electrode 114 of the pump cell 150 will be simply referred to as the "pump cell voltage Vp".

The cell temperature detecting unit 13 detects the temperature of the pump cell 150. Specifically, in the present embodiment, the cell temperature detecting unit 13 detects the temperature of the pump cell 150 on the basis of the impedance of the pump cell 150.

Figure 6:
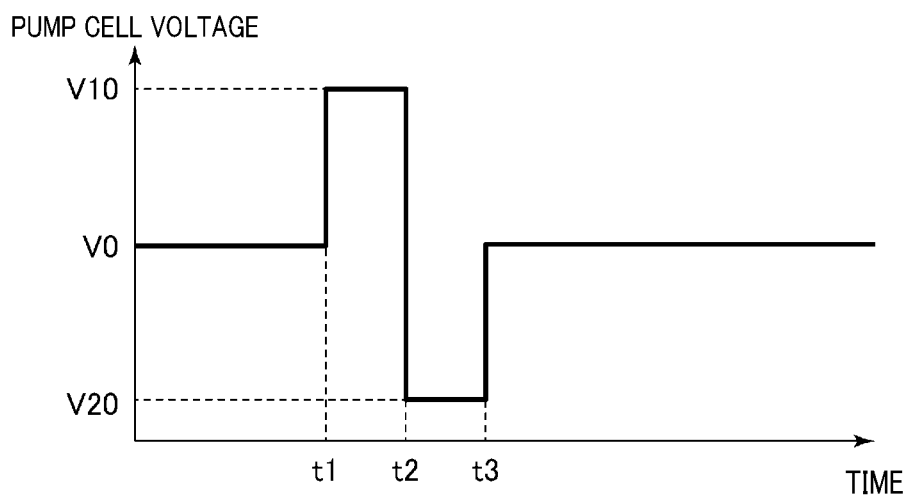
FIG. 6 is a time chart illustrating the manner of detecting the temperature of a pump cell of the exhaust gas sensor by a cell temperature detecting unit of the control apparatus.

More specifically, as shown in FIG. 6, in detecting the temperature of the pump cell 150, the cell temperature detecting unit 13 increases, at a time instant t1, the pump cell voltage Vp from an initial value V0 to a value V10 that is higher than V0. Then, the cell temperature detecting unit 13 keeps the pump cell voltage Vp at V10 for a duration (t1-t2) from the time instant t1 to a time instant t2.

Consequently, with the increase in the pump cell voltage Vp, the pump cell current Ip flowing between the pump electrode 111 and the common electrode 114 also increases. The cell temperature detecting unit 13 calculates the impedance of the pump cell 150 by dividing the amount of increase in the pump cell voltage Vp during the duration (t1-t2) by the amount of increase in the pump cell current Ip during the duration (t1-t2).

There is a correlation between the impedance of the pump cell 150 and the temperature of the pump cell 150. This correlation has been measured and stored as a map in the ROM of the control apparatus 10. The cell temperature detecting unit 13 determines, using the map, the temperature of the pump cell 150 on the basis of the calculated impedance of the pump cell 150.

Further, at the time instant t2, the cell temperature detecting unit 13 lowers the pump cell voltage Vp from V10 to a value V20 that is lower than V0. Then, the cell temperature detecting unit 13 keeps the pump cell voltage Vp at V20 for a duration (t2-t3) from the time instant t2 to a time instant t3. Thereafter, at the time instant t3, the cell temperature detecting unit 13 returns the pump cell voltage Vp to the initial value V0.

Consequently, by keeping the pump cell voltage Vp at V20 for the duration (t2-t3), it is possible to prevent electric charge from being stored in the pump cell 150 over time.

In addition, the time period during which the pump cell voltage Vp is changed for detection of the temperature of the pump cell 150 (i.e., the time period from the time instant t1 to the time instant t3 in FIG. 6) is very short, more specifically on the order of microseconds. Moreover, the change in the pump cell current Ip caused by the change in the pump cell voltage Vp is so small as to be negligible. Therefore, the change in the pump cell voltage Vp made for detection of the temperature of the pump cell 150 hardly affects measurement of the oxygen concentration by the monitor cell 170 and/or measurement of the nitrogen oxides concentration by the sensor cell 160.

The temperature detecting unit 13 also detects the temperature of the sensor cell 160 and the temperature of the monitor cell 170 in the same manner as the detection of the temperature of the pump cell 150 as described above.

Referring back to FIG. 2, the gas temperature detecting unit 14 detects the temperature of the exhaust gas around the exhaust gas sensor 100. Specifically, the gas temperature detecting unit 14 determines the temperature of the exhaust gas on the basis of a signal inputted from the gas temperature sensor 22; the signal is indicative of the temperature of the exhaust gas detected by the gas temperature sensor 22.

The active-state determining unit 15 determines whether or not all of the pump cell 150, the sensor cell 160 and the monitor cell 170 are in their respective active states. Specifically, the active-state determining unit 15 makes this determination on the basis of the temperature of the pump cell 150 detected by the cell temperature detecting unit 13.

Figure 7:
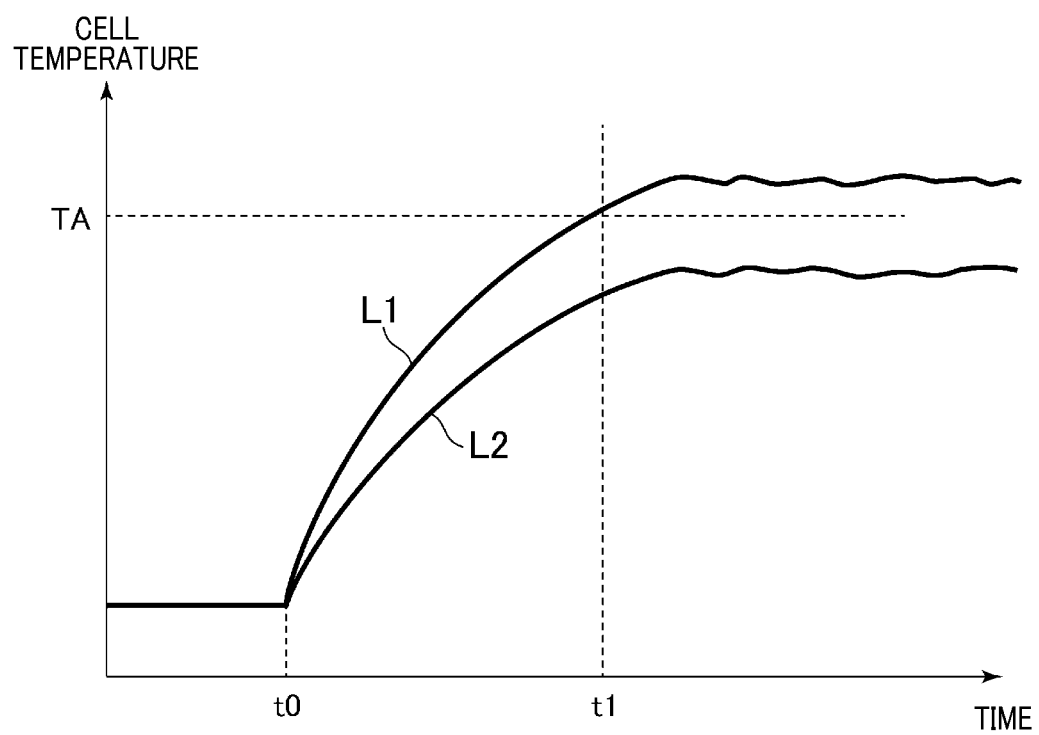
FIG. 7 is a graphical representation illustrating both the change with time of the temperature of the pump cell and the change with time of the temperature of a sensor cell of the exhaust gas sensor after start of an internal combustion engine of the vehicle.

FIG. 7 shows the changes with time of the temperatures of the cells 150-170 of the exhaust gas sensor 100 detected by the cell temperature detecting unit 13 after start of the internal combustion engine EG.

Specifically, in FIG. 7, the line L1 represents the change with time of the temperature of the pump cell 150 while the line L2 represents the change with time of the temperature of the sensor cell 160. In addition, the change with time of the temperature of the monitor cell 170 is identical to the change with time of the temperature of the sensor cell 160 and thus can also be represented by the line L2.

As shown in FIG. 7, at a time instant t0, the control apparatus 10 starts temperature-increasing control to cause each of the temperatures of the cells 150-170 of the exhaust gas sensor 100 to increase. Then, at a time instant t1 later than t0, the temperature of the pump cell 150 exceeds a predetermined activation temperature TA. The activation temperature TA is predetermined as the temperature of the pump cell 150 when all of the pump cell 150, the sensor cell 160 and the monitor cell 170 become active (or are brought into their respective active states).

Accordingly, in the present embodiment, the active-state determining unit 15 determines, when the temperature of the pump cell 150 detected by the cell temperature detecting unit 13 is higher than the predetermined activation temperature TA, that all of the pump cell 150, the sensor cell 160 and the monitor cell 170 are in their respective active states.

Alternatively, the active-state determining unit 15 may determine, when the temperature of the sensor cell 160 (or the temperature of the monitor cell 170) detected by the cell temperature detecting unit 13 is higher than a predetermined activation temperature, that all of the pump cell 150, the sensor cell 160 and the monitor cell 170 are in their respective active states. As another alternative, the active-state determining unit 15 may determine, for each of the cells 150-170, whether or not the cell is in its active state on the basis of the temperature of the cell detected by the cell temperature detecting unit 13.

Alternatively, the exhaust gas sensor 100 may further include a resistor or thermistor for detecting a temperature and the active-state determining unit 15 may determine whether or not all of the pump cell 150, the sensor cell 160 and the monitor cell 170 are in their respective active states on the basis of the temperature detected by the resistor or thermistor. For example, the exhaust gas sensor 100 may have a resistor embedded in the main body 120 thereof. The cell temperature detecting unit 13 may detect the temperature of the resistor by: 1) applying a voltage to the resistor; 2) calculating the resistance of the resistor on the basis of the electric current flowing through the resistor under the voltage; and 3) determining the temperature of the resistor on the basis of a predetermined correlation between the resistance and temperature of the resistor. Then, the active-state determining unit 15 may determine, when the detected temperature of the resistor is higher than a predetermined activation temperature, that all of the pump cell 150, the sensor cell 160 and the monitor cell 170 are in their respective active states.

As another alternative, the cell temperature detecting unit 13 may detect the temperature of the heater 180 by: 1) applying a voltage to the heater 180; 2) calculating the resistance of the heater 180 on the basis of the electric current flowing through the heater 180 under the voltage; and 3) determining the temperature of the heater 180 on the basis of a predetermined correlation between the resistance and temperature of the heater 180. Then, the active-state determining unit 15 may determine, when the detected temperature of the heater 180 is higher than a predetermined activation temperature, that all of the pump cell 150, the sensor cell 160 and the monitor cell 170 are in their respective active states.

As yet another alternative, the exhaust gas sensor 100 may be configured to determine whether or not all of the pump cell 150, the sensor cell 160 and the monitor cell 170 are in their respective active states and output a signal indicative of the determination result. In this case, the active-state determining unit 15 may receive the signal outputted from the exhaust gas sensor 100 and determine whether or not all of the pump cell 150, the sensor cell 160 and the monitor cell 170 are in their respective active states on the basis of the received signal.

Referring back to FIG. 2, the deterioration determining unit 16 determines whether or not deterioration has occurred in the exhaust gas sensor 100. The manner of the deterioration determination by the deterioration determining unit 16 will be described below with reference to FIG. 8.

Figure 8:
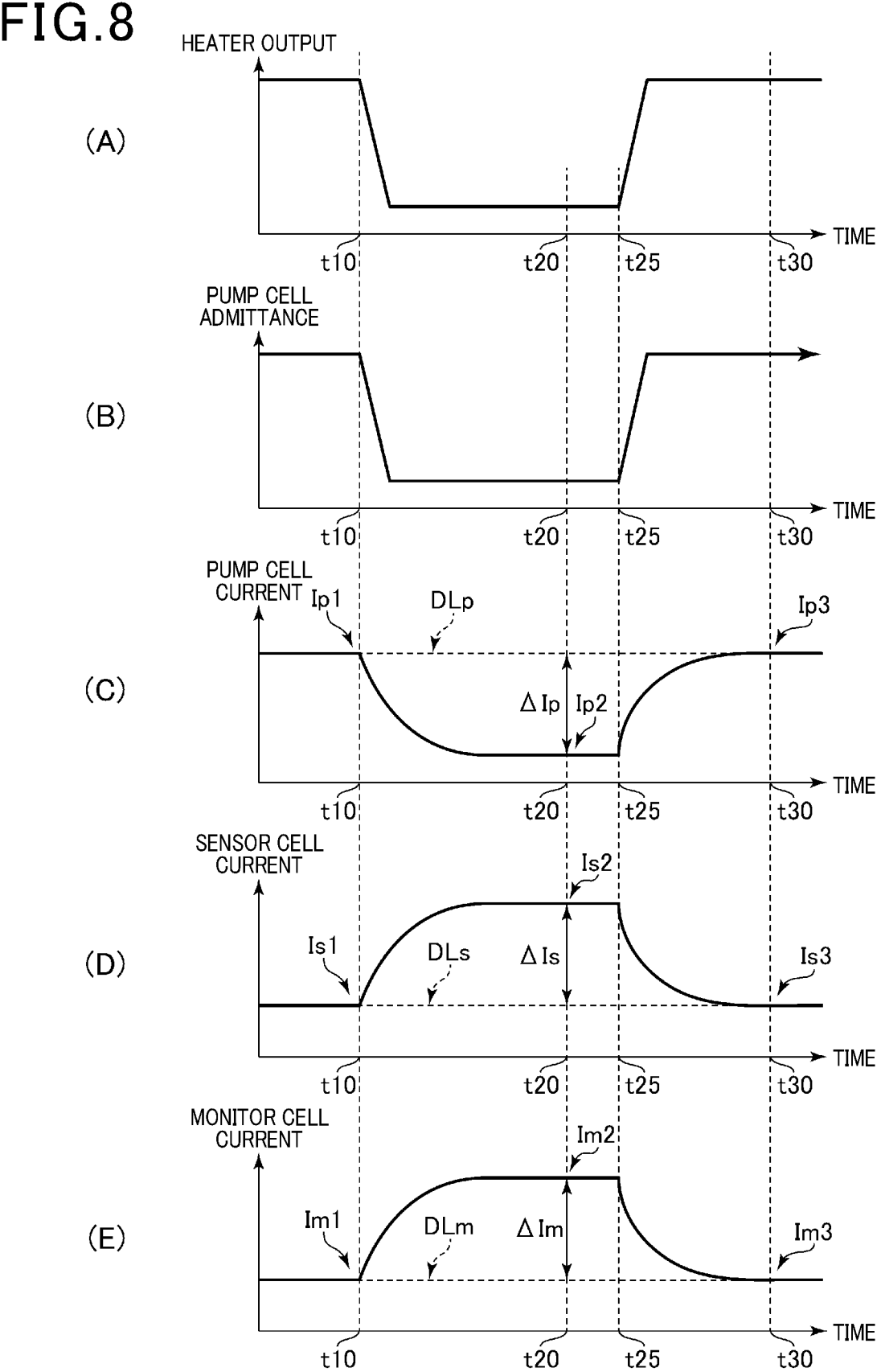
FIG. 8 is a schematic diagram including time charts (A)-(E) respectively illustrating the changes with time of the heater output, the pump cell admittance, the pump cell current, the sensor cell current and the monitor cell current during the deterioration determination by a deterioration determining unit of the control apparatus.

FIG. 8 (A) shows the change with time of the output of the heater 180 (to be simply referred to as the "heater output" hereinafter) during the deterioration determination by the deterioration determining unit 16. FIG. 8 (B) shows the change with time of the admittance of the pump cell 150 during the deterioration determination by the deterioration determining unit 16. Here, the admittance of the pump cell 150 is the reciprocal of the impedance of the pump cell 150 which is calculated during the detection (or determination) of the temperature of the pump cell 150 by the cell temperature detecting unit 13.

FIG. 8 (C) shows the change with time of the pump cell current Ip during the deterioration determination by the deterioration determining unit 16. FIG. 8 (D) shows the change with time of the sensor cell current Is during the deterioration determination by the deterioration determining unit 16. FIG. 8 (E) shows the change with time of the monitor cell current Im during the deterioration determination by the deterioration determining unit 16.

In the present embodiment, as shown in FIG. 8, during a time period until a time instant t10, the control apparatus 10 performs normal control, i.e., control for measuring the concentration of nitrogen oxides in the exhaust gas. On the other hand, during a time period from the time instant t10 to a time instant t30, the deterioration determining unit 16 performs control for determining whether or not deterioration has occurred in the exhaust gas sensor 100.

Specifically, as shown in FIG. 8 (A), at the time instant t10, the deterioration determining unit 16 causes the heater controlling unit 11 to temporarily reduce (or lower) the output of the heater 180 from an initial value. Consequently, from the time instant t10, the temperature of the pump cell 150 decreases, causing the admittance of the pump cell 150 to decrease as shown in FIG. 8 (B). Moreover, as shown in FIG. 8 (C), from the time instant t10, the pump cell current Ip gradually decreases from an initial value Ip1 to a value Ip2; then the pump cell current Ip is kept substantially constant at Ip2.

The amplitude of the pump cell current Ip represents the amount of oxygen removed by the pump cell 150 from the exhaust gas in the measurement chamber 121. From the time instant t10, with the decrease in the admittance of the pump cell 150, the amount of oxygen removed by the pump cell 150 from the exhaust gas in the measurement chamber 121 also decreases. Consequently, the amount of oxygen flowing through the pump cell 150 to reach the sensor cell 160 or the monitor cell 170 increases from the time instant t10. That is, the amount of oxygen flowing as indicated by the arrow AR10 in FIG. 4 decreases while the amount of oxygen flowing as indicated by the arrows AR11 and AR 12 in FIG. 4 increases.

As a result, as shown in FIG. 8 (D), from the time instant t10, the sensor cell current Is gradually increases from an initial value Is1 to a value Is2; then the sensor cell current Is is kept substantially constant at Is2. Similarly, as shown in FIG. 8 (E), from the time instant t10, the monitor cell current Im gradually increases from an initial value Im1 to a value Im2; then the monitor cell current Im is kept substantially constant at Im2.

Next, as shown in FIG. 8 (A), at a time instant t25 after the pump cell current Ip has become substantially constant, the deterioration determining unit 16 causes the heater controlling unit 11 to return (or increase) the output of the heater 180 to the initial value. Consequently, from the time instant t25, the temperature of the pump cell 150 increases, causing the admittance of the pump cell 150 to increase as shown in FIG. 8 (B). Moreover, as shown in FIG. 8 (C), from the time instant t25, the pump cell current Ip gradually increases from Ip2 to a value Ip3; then the pump cell current Ip is kept substantially constant at Ip3.

From the time instant t25, with the increase in the admittance of the pump cell 150, the amount of oxygen removed by the pump cell 150 from the exhaust gas in the measurement chamber 121 returns (or increases) to its initial level. Consequently, the amount of oxygen flowing through the pump cell 150 to reach the sensor cell 160 or the monitor cell 170 decreases from the time instant t25.

As a result, as shown in FIG. 8 (D), from the time instant t25, the sensor cell current Is gradually decreases from Is2 to a value Is3; then the sensor cell current Is is kept substantially constant at Is3. Similarly, as shown in FIG. 8 (E), from the time instant t25, the monitor cell current Im gradually decreases from Im2 to a value Im3; then the monitor cell current Im is kept substantially constant at Im3.

In addition, in FIG. 8, the time instant at which the pump cell current Ip has been decreased from the initial value Ip1 to become substantially constant at Ip2 is designated by t20; the time instant at which the pump cell current Ip has been increased from Ip2 to become substantially constant at Ip3 is designated by t30.

In FIG. 8 (C), the dashed line DLp indicates the change with time of the pump cell current Ip in the case of assuming that the pump cell current Ip changes at a constant slope from Ip1 to Ip3 during the time period (t10-t430) from the time instant t10 to the time instant t30. That is, the dashed line DLp represents the change with time of the pump cell current Ip in the case of keeping the heater output unchanged during the time period (t10-t30).

Moreover, in FIG. 8 (C), the difference between Ip2 and the value of the pump cell current Ip on the dashed line DLp at the time instant t20 is designated by ΔIp. That is, ΔIp represents the amount of change (i.e., the amount of decrease) in the pump cell current Ip caused by changing (i.e., reducing) the heater output.

In FIG. 8 (D), the dashed line DLs indicates the change with time of the sensor cell current Is in the case of assuming that the sensor cell current Is changes at a constant slope from Is1 to Is3 during the time period (t10-t30) from the time instant t10 to the time instant t30. That is, the dashed line DLs represents the change with time of the sensor cell current Is in the case of keeping the heater output unchanged during the time period (t10-t30).

Moreover, in FIG. 8 (D), the difference between Is2 and the value of the sensor cell current Is on the dashed line DLs at the time instant t20 is designated by ΔIs. That is, ΔIs represents the amount of change (i.e., the amount of increase) in the sensor cell current Is caused by changing (i.e., reducing) the heater output.

In FIG. 8 (E), the dashed line DLm indicates the change with time of the monitor cell current Im in the case of assuming that the monitor cell current Im changes at a constant slope from Im1 to Im3 during the time period (t10-t30) from the time instant t10 to the time instant t30. That is, the dashed line DLm represents the change with time of the monitor cell current Im in the case of keeping the heater output unchanged during the time period (t10-t30).

Moreover, in FIG. 8 (E), the difference between Im2 and the value of the monitor cell current Im on the dashed line DLm at the time instant t20 is designated by ΔIm. That is, ΔIm represents the amount of change (i.e., the amount of increase) in the monitor cell current Im caused by changing (i.e., reducing) the heater output.

When no deterioration has occurred in the exhaust gas sensor 100, the relationship between ΔIp and ΔIs and the relationship between ΔIp and ΔIm are substantially constant.

Figure 9:
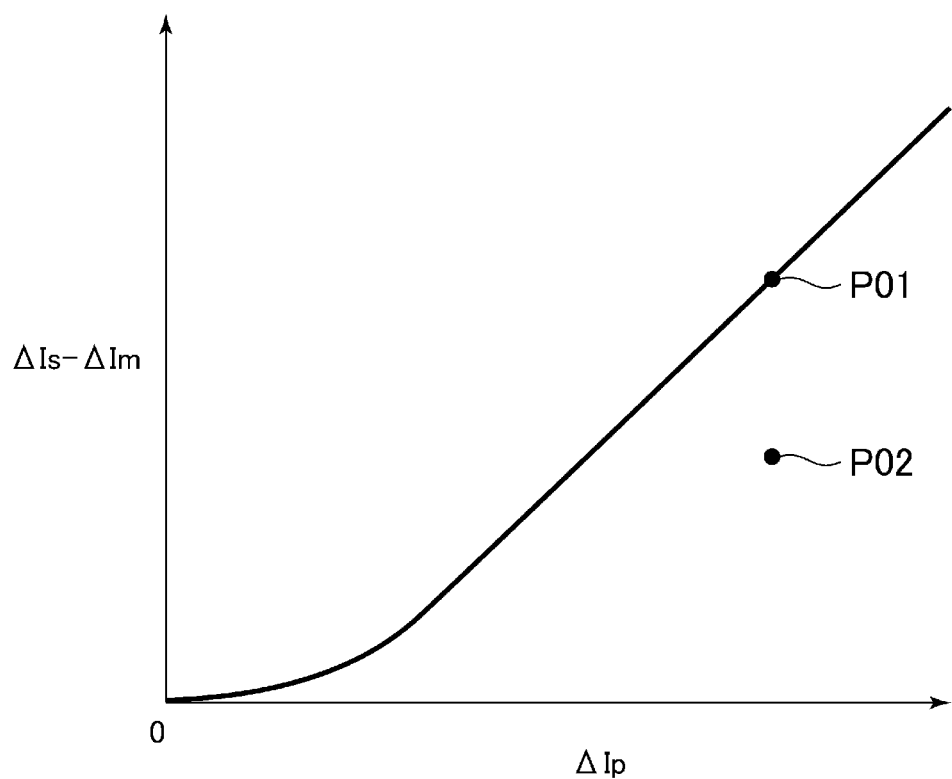
FIG. 9 is a graphical representation illustrating the manner of the deterioration determination by the deterioration determining unit of the control apparatus.

In FIG. 9, the thick line represents the relationship between ΔIp (the horizontal axis) and (ΔIs-ΔIm) (the vertical axis) when the exhaust gas sensor 100 is normal (i.e., no deterioration has occurred in the exhaust gas sensor 100).

When both the sensor cell 160 and the monitor cell 170 are normal (i.e., not deteriorated), each point representing corresponding values of ΔIp and (ΔIs-ΔIm) falls on the thick line. In addition, in FIG. 9, P01 designates an example of such a point.

On the other hand, when at least one of the sensor cell 160 and the monitor cell 170 is deteriorated, each point representing corresponding values of ΔIp and (ΔIs-ΔIm) deviates from (i.e., does not fall on) the thick line. In addition, in FIG. 9, P02 designates an example of such a point.

In view of the above, in the present embodiment, the deterioration determining unit 16 first calculates ΔIp and (ΔIs-ΔIm) and then determines whether or not deterioration has occurred in the exhaust gas sensor 100 on the basis of the degree of deviation of the point representing the calculated ΔIp and (ΔIs-ΔIm) from the thick line in FIG. 9.

Specifically, when the distance between the point representing the calculated ΔIp and (ΔIs-ΔIm) and the thick line in FIG. 9 is shorter than equal to a predetermined distance, the deterioration determining unit 16 determines that no deterioration has occurred in the exhaust gas sensor 100; in contrast, when the distance is longer than the predetermined distance, the deterioration determining unit 16 determines that deterioration has occurred in the exhaust gas sensor 100.

Moreover, when it is determined by the deterioration determining unit 16 that deterioration has occurred in the exhaust gas sensor 100, the control apparatus 10 takes measures such as performing correction on the measured concentration of nitrogen oxides in the exhaust gas, inhibiting measurement of the concentration of nitrogen oxides in the exhaust gas (or causing the engine ECU not to use the results of the measurement) and warning the vehicle driver of the occurrence of deterioration in the exhaust gas sensor 100.

Alternatively, in FIG. 9, the vertical axis may represent ΔIs instead of (ΔIs-ΔIm) and there may be drawn a line representing the relationship between ΔIp and ΔIs when the exhaust gas sensor 100 is normal. In this case, the deterioration determining unit 16 may determine whether or not the sensor cell 160 is deteriorated on the basis of the degree of deviation of the point representing the calculated ΔIp and ΔIs from the line.

As another alternative, in FIG. 9, the vertical axis may represent ΔIm instead of (ΔIs-ΔIm) and there may be drawn a line representing the relationship between ΔIp and ΔIm when the exhaust gas sensor 100 is normal. In this case, the deterioration determining unit 16 may determine whether or not the monitor cell 170 is deteriorated on the basis of the degree of deviation of the point representing the calculated ΔIp and ΔIm from the line.

Next, a deterioration determining process performed by the control apparatus 10 according to the present embodiment will be described with reference to FIG. 10.

The deterioration determining process is repeatedly performed, at predetermined time intervals, mainly by the deterioration determining unit 16 of the control apparatus 10.

Upon start of the process, in step S01, the deterioration determining unit 16 determines whether the temperature of the exhaust gas detected by the gas temperature detecting unit 14 is lower than a predetermined upper limit temperature.

When the temperature of the exhaust gas is higher than or equal to the upper limit temperature, even with reduction in the heater output for the deterioration determination, the admittance of the pump cell 150 may be insufficiently lowered due to heat from the exhaust gas. Consequently, the increase in the amount of oxygen flowing through the pump cell 150 to reach the sensor cell 160 or the monitor cell 170 may become small. As a result, ΔIs and ΔIm may become too small for the deterioration determining unit 16 to accurately make the deterioration determination.

In view of the above, in the present embodiment, if the determination in step S01 results in a "NO" answer, the process terminates without making the deterioration determination. In contrast, if the determination in step S01 results in a "YES" answer, the process proceeds to step S02.

In step S02, the active-state determining unit 15 determines whether or not all of the pump cell 150, the sensor cell 160 and the monitor cell 170 are in their respective active states.

If the determination in step S02 results in a "NO" answer, the process terminates without making the deterioration determination. In contrast, if the determination in step S02 results in a "YES" answer, the process proceeds to step S03.

In step S03, the deterioration determining unit 16 acquires the values of the pump cell current Ip, the sensor cell current Is and the monitor cell current Im detected by the current detecting unit 12 at the present time and stores the acquired values in a not-shown memory of the control apparatus 10.

In addition, the values of the pump cell current Ip, the sensor cell current Is and the monitor cell current Im acquired in step S03 respectively correspond to the initial values Ip1, Is1 and Im1 shown in FIG. 8.

In step S04, the deterioration determining unit 16 causes the heater controlling unit 11 to adjust the output of the heater 180 so as to temporarily lower the temperature of the pump cell 150. More specifically, in this step, the heater controlling unit 11 adjusts the duty cycle of electric current supplied to the heater 180 so as to reduce the output of the heater 180 from the initial value thereof. Consequently, with the reduction in the heater output, the temperature of the pump cell 150 starts decreasing.

In step S05, the deterioration determining unit 16 determines whether the temperature of the pump cell 150 detected by the cell temperature detecting unit 13 has been decreased to a preset target temperature. Here, the target temperature is preset so as to have the admittance of the pump cell 150 decreased to such a level as to allow the deterioration determining unit 16 to accurately make the deterioration determination.

In addition, the lower the target temperature, the larger the decrease in the admittance of the pump cell 150. Therefore, in terms of accurately making the deterioration determination, it is preferable to preset the target temperature as low as possible. On the other hand, if the target temperature is too low, the temperatures of the sensor cell 160 and the monitor cell 170 may be excessively lowered, thereby brining these cells 160 and 170 into their respective inactive states.

Figure 11:
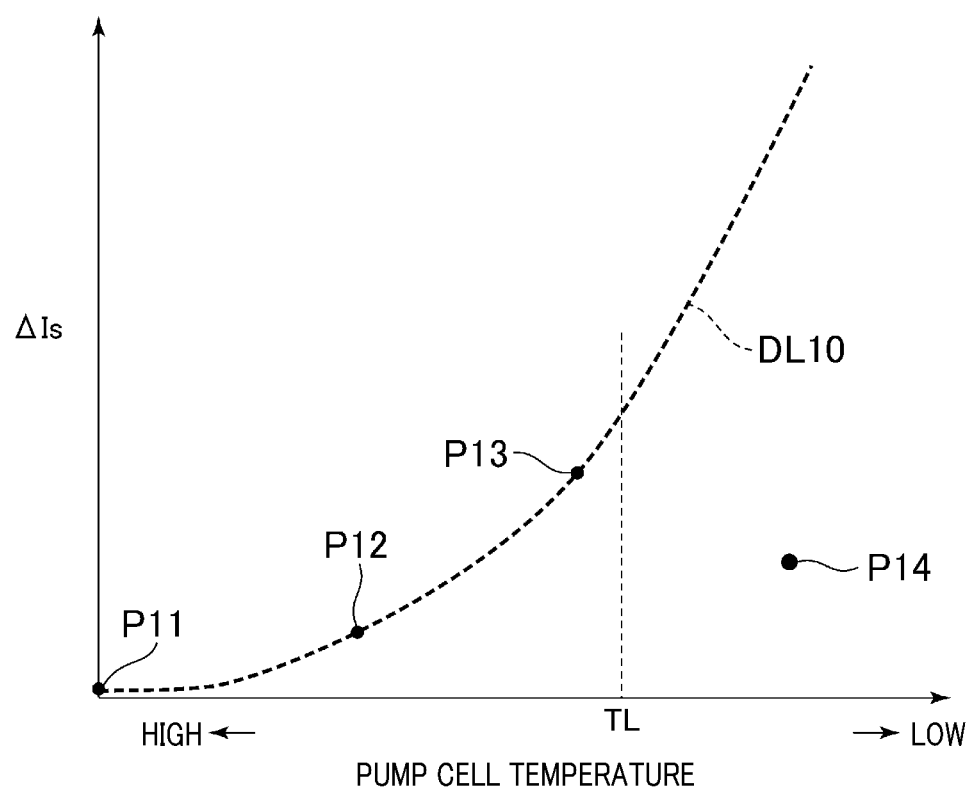
FIG. 11 is a graphical representation illustrating the relationship between the pump cell temperature and the amount of change in the sensor cell current.

In FIG. 11, the dashed line DL10 represents the relationship between the temperature of the pump cell 150 detected by the cell temperature detecting unit 13 (the horizontal axis) and ΔIs (the vertical axis). As described previously, ΔIs represents the amount of change in the sensor cell current Is caused by changing the heater output.

If no deterioration has occurred in the exhaust gas sensor 100, when the temperature of the pump cell 150 is higher than a threshold value TL, each point representing the temperature of the pump cell 150 and the calculated ΔIs falls on the dashed line DL10. In addition, in FIG. 11, P11, P12 and P13 respectively designate examples of such a point.

On the other hand, when the temperature of the pump cell 150 is not higher than the threshold value TL, each point representing the temperature of the pump cell 150 and the calculated ΔIs falls below the dashed line DL10 even if no deterioration has occurred in the exhaust gas sensor 100. In addition, in FIG. 11, P14 designates an example of such a point.

It should be noted that in FIG. 11, the vertical axis may alternatively represent (ΔIs-ΔIm) and there may alternatively be drawn a line representing the relationship between the temperature of the pump cell 150 detected by the cell temperature detecting unit 13 and (ΔIs-ΔIm).

Figure 10:
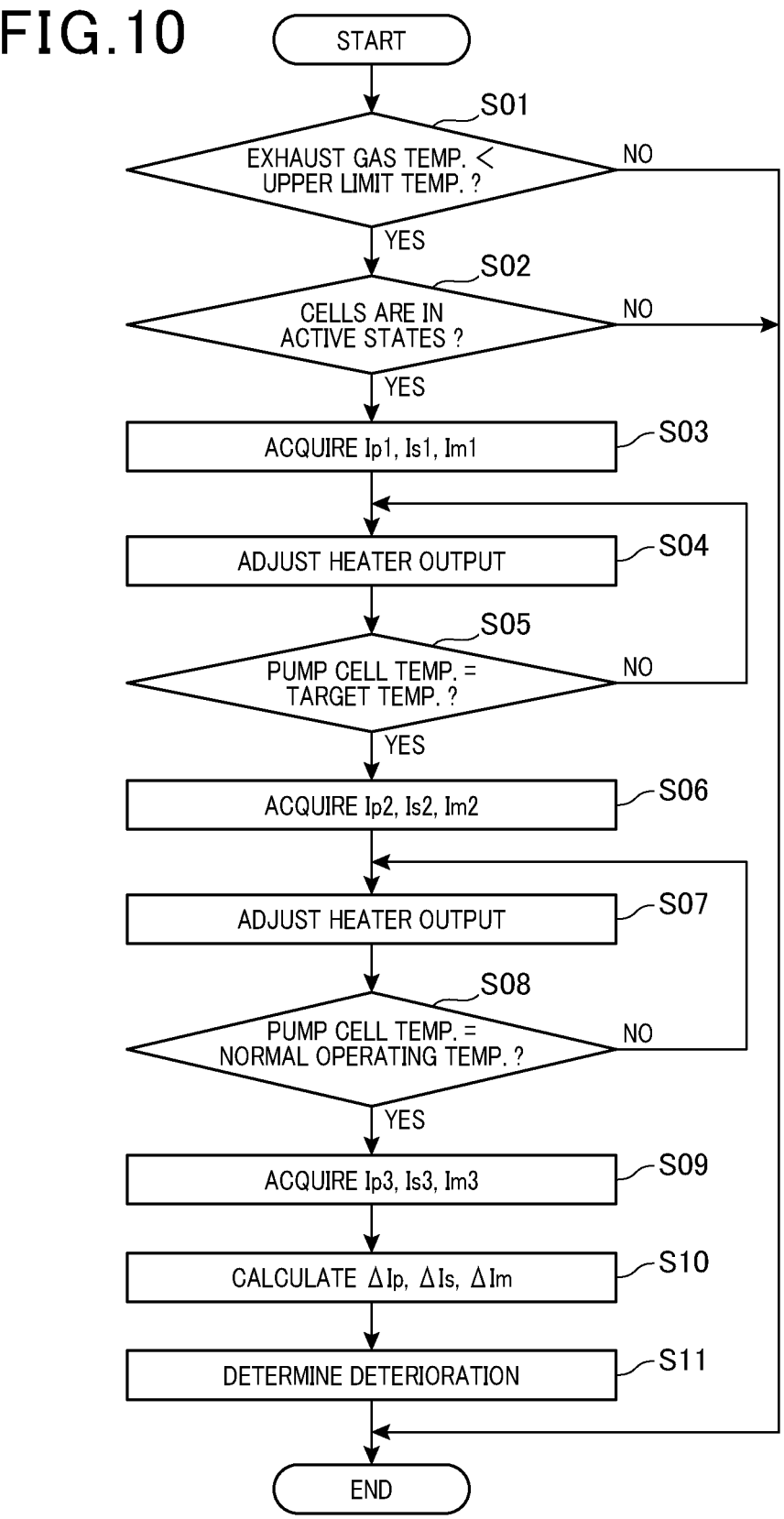
FIG. 10 is a flow chart illustrating a deterioration determining process performed by the deterioration determining unit of the control apparatus.

In view of the above, in the present embodiment, the target temperature used in the determination in step S05 of the deterioration determining process shown in FIG. 10 is preset to be higher than the threshold value TL in FIG. 11. That is, the target temperature is preset so as to keep both the sensor cell 160 and the monitor cell 170 in their respective active states.

If the determination in step S05 results in a "NO" answer, the process returns to step S04 to repeat steps S04 and S05. In contrast, if the determination in step S05 results in a "YES" answer, the process proceeds to step S06.

In step S06, the deterioration determining unit 16 acquires the values of the pump cell current Ip, the sensor cell current Is and the monitor cell current Im detected by the current detecting unit 12 at the present time and stores the acquired values in the not-shown memory of the control apparatus 10.

In addition, the values of the pump cell current Ip, the sensor cell current Is and the monitor cell current Im acquired in step S06 respectively correspond to the values Ip2, Is2 and Im2 shown in FIG. 8. Moreover, the timing of acquiring these values in step S06 is set so as to acquire these values after the pump cell current Ip, the sensor cell current Is and the monitor cell current Im become substantially constant respectively at Ip2, Is2 and Im2.

In step S07, the deterioration determining unit 16 causes the heater controlling unit 11 to adjust the output of the heater 180 so as to increase the temperature of the pump cell 150. More specifically, in this step, the heater controlling unit 11 adjusts the duty cycle of electric current supplied to the heater 180 so as to return the output of the heater 180 to the initial value thereof. Consequently, with the increase in the heater output, the temperature of the pump cell 150, which has been temporarily lowered, starts increasing.

In step S08, the deterioration determining unit 16 determines whether the temperature of the pump cell 150 detected by the cell temperature detecting unit 13 has been increased to a normal operating temperature. Here, the normal operating temperature is preset to the temperature of the pump cell 150 during the normal operation of the exhaust gas sensor 100 for measuring the concentration of nitrogen oxides in the exhaust gas (i.e., not for the deterioration determination).

It should be noted that: the temperature of the pump cell 150 may be detected by the cell temperature detecting unit 13 immediately before step S04; and the normal operating temperature of the pump cell 150 may be preset to the temperature detected immediately before step S04.

If the determination in step S08 results in a "NO" answer, the process returns to step S07 to repeat steps S07 and S08. In contrast, if the determination in step S08 results in a "YES" answer, the process proceeds to step S09.

In step S09, the deterioration determining unit 16 acquires the values of the pump cell current Ip, the sensor cell current Is and the monitor cell current Im detected by the current detecting unit 12 at the present time and stores the acquired values in the not-shown memory of the control apparatus 10.

In addition, the values of the pump cell current Ip, the sensor cell current Is and the monitor cell current Im acquired in step S09 respectively correspond to the values Ip3, Is3 and Im3 shown in FIG. 8. Moreover, the timing of acquiring these values in step S09 is set so as to acquire these values after the pump cell current Ip, the sensor cell current Is and the monitor cell current Im become substantially constant respectively at Ip3, Is3 and Im3.

In step S10, the deterioration determining unit 16 calculates ΔIp, ΔIs and ΔIm which respectively represent the amount of change in the pump cell current Ip, the amount of change in the sensor cell current Is and the amount of change in the monitor cell current Im caused by temporarily changing the heater output.

Specifically, in this step, the deterioration determining unit 16 calculates, based on Ip1 acquired in step S03, Ip2 acquired in step S06 and Ip3 acquired in step S09, ΔIp in the manner described above with reference to FIG. 8 (C). In addition, ΔIp may alternatively be calculated simply by subtracting Ip2 from Ip1 (or subtracting Ip2 from Ip3).

Moreover, the deterioration determining unit 16 calculates, based on Is1 acquired in step S03, Is2 acquired in step S06 and Is3 acquired in step S09, ΔIs in the manner described above with reference to FIG. 8 (D). In addition, ΔIs may alternatively be calculated simply by subtracting Is1 from Is2 (or subtracting Is3 from Is2).

Furthermore, the deterioration determining unit 16 calculates, based on Im1 acquired in step S03, Im2 acquired in step S06 and Im3 acquired in step S09, ΔIm in the manner described above with reference to FIG. 8 (E). In addition, ΔIm may alternatively be calculated simply by subtracting Im1 from Im2 (or subtracting Im3 from Im2).

In step S11, the deterioration determining unit 16 determines, based on ΔIp, ΔIs and ΔIm calculated in step S10, whether or not at least one of the sensor cell 160 and the monitor cell 170 is deteriorated.

Specifically, in this step, the deterioration determining unit 16 makes the determination on the basis of the degree of deviation of the point representing the calculated ΔIp and (ΔIs-ΔIm) from the thick line in FIG. 9.

After step S11, the deterioration determining process terminates.

As described above, in the control apparatus 10 according to the present embodiment, the deterioration determining unit 16 causes the heater controlling unit 11 to temporarily reduce the output of the heater 180, thereby temporarily lowering the temperature of the pump cell 150 and temporarily increasing the amount of oxygen flowing through the pump cell 150 to reach the sensor cell 160 or the monitor cell 170. The deterioration determining unit 16 determines, during the temporary reduction in the output of the heater 180, whether or not at least one of the sensor cell 160 and the monitor cell 170 is deteriorated on the basis of the amount of change in the pump cell current Ip (i.e., ΔIp), the amount of change in the sensor cell current Is (i.e., ΔIs) and the amount of change in the monitor cell current Im (i.e., ΔIm).

The amount of oxygen flowing through the pump cell 150 to reach the sensor cell 160 or the monitor cell 170 may also be temporarily changed by temporarily changing the pump cell voltage Vp instead of temporarily changing the temperature of the pump cell 150 (i.e., temporarily changing the output of the heater 180).

However, the pump cell 150 has, as a capacitor, a capacitance component. Therefore, when the pump cell voltage Vp is changed for the deterioration determination, electric charge stored in the pump cell 150 is released from the pump cell 150. That is, capacitive discharge of the pump cell 150 takes place. Consequently, under the influence of the capacitive discharge, the sensor cell current Is fluctuates so that it takes a relatively long time for the sensor cell current Is to settle at a constant value. As a result, it takes a relatively long time to make the deterioration determination on the basis of the amount of change in the sensor cell current Is.

Figure 12:
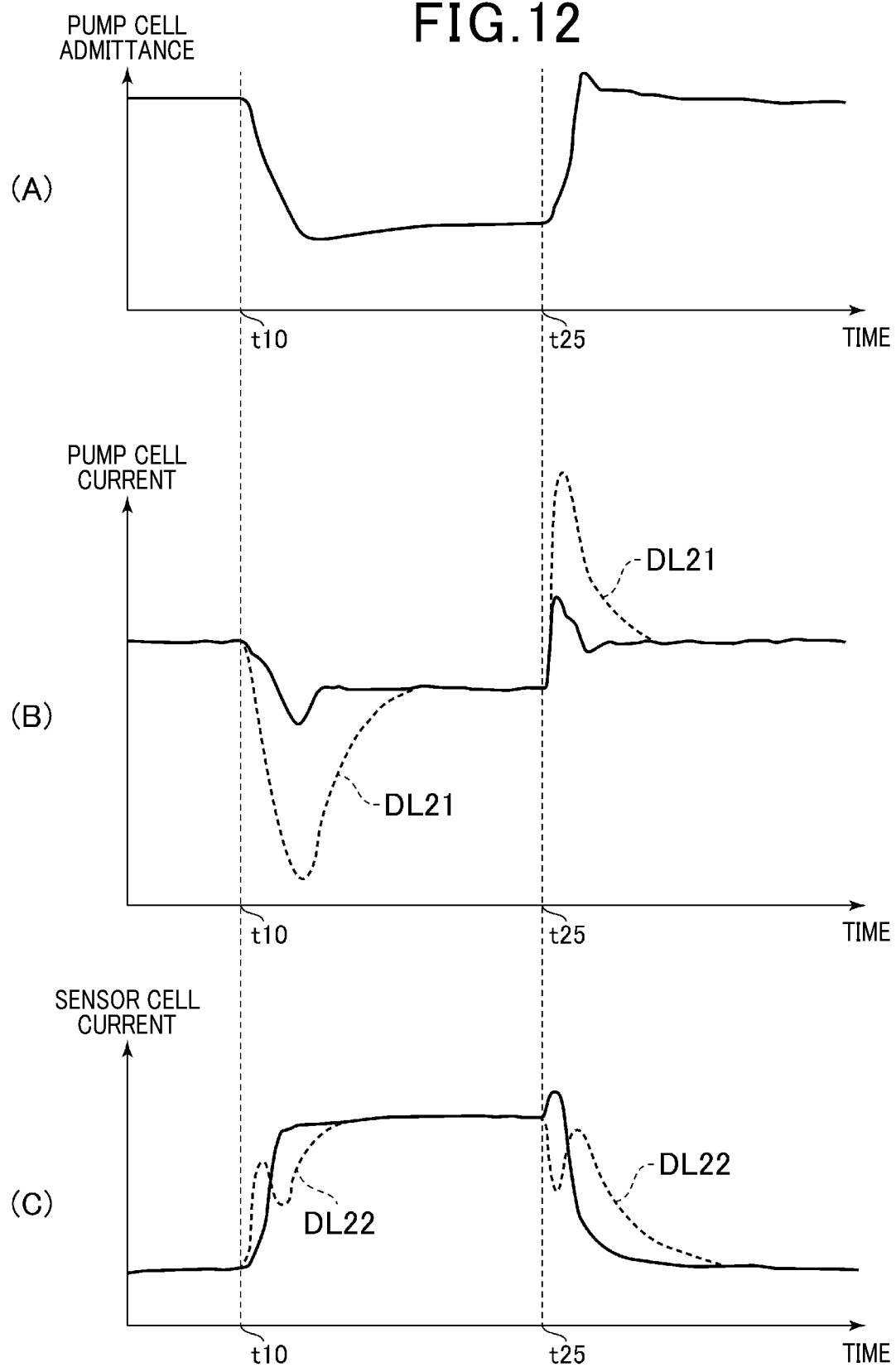
FIG. 12 is a diagram including time charts (A)-(C) respectively illustrating the changes with time of the actually-measured pump cell admittance, pump cell current and sensor cell current during the deterioration determination by the deterioration determining unit of the control apparatus.

FIG. 12 (A) shows the change with time of the actually-measured admittance of the pump cell 150 during the deterioration determination by the deterioration determining unit 16 of the control apparatus 10 according to the present embodiment. In addition, FIG. 12 (A) corresponds to FIG. 8 (B).

In FIG. 12 (B), the thick solid line represents the change with time of the actually-measured pump cell current Ip during the deterioration determination by the deterioration determining unit 16 of the control apparatus 10 according to the present embodiment. In comparison, the dashed line DL21 represents the change with time of the actually-measured pump cell current Ip during the deterioration determination made by temporarily lowering the pump cell voltage Vp instead of temporarily reducing the heater output. In addition, FIG. 12 (B) corresponds to FIG. 8(C).

In FIG. 12 (C), the thick solid line represents the change with time of the actually-measured sensor cell current Is during the deterioration determination by the deterioration determining unit 16 of the control apparatus 10 according to the present embodiment. In comparison, the dashed line DL22 represents the change with time of the actually-measured sensor cell current Is during the deterioration determination made by temporarily lowering the pump cell voltage Vp instead of temporarily reducing the heater output. In addition, FIG. 12 (C) corresponds to FIG. 8(D).

As shown with the dashed line DL21 in FIG. 12 (B), in the case of making the deterioration determination by temporarily lowering the pump cell voltage Vp, a large capacitive discharge of the pump cell 150 takes place immediately after the time instant t10, causing the pump cell current Ip to significantly drop once. Then, the pump cell current Ip gradually increases to converge substantially on a constant value. Moreover, the pump cell current Ip significantly increases once immediately after the time instant t25 at which the pump cell voltage Vp is returned (i.e., increased) to its initial value. Then, the pump cell current Ip gradually decreases to converge substantially on a constant value.

It is not preferable to acquire the values Ip2 and Ip3 (see FIG. 8 (C)) of the pump cell current IP during fluctuation of the pump cell current Ip. Therefore, in the case of making the deterioration determination by temporarily lowering the pump cell voltage Vp, both the timing of acquiring the value Ip2 and the timing of acquiring the value Ip3 respectively become later than those in the deterioration determination by the deterioration determining unit 16 of the control apparatus 10 according to the present embodiment.

Similarly, as shown with the dashed line DL22 in FIG. 12 (C), in the case of making the deterioration determination by temporarily lowering the pump cell voltage Vp, a large capacitive discharge of the pump cell 150 takes place immediately after the time instant t10, causing the sensor cell current Is to increase once to a peak value. Thereafter, the sensor cell current Is drops from the peak value and then increases again to converge substantially on a constant value that is higher than peak value. Moreover, the sensor cell current Is drops once to a trough value immediately after the time instant t25 at which the pump cell voltage Vp is returned to its initial value. Thereafter, the sensor cell current Is increases from the trough value and then drops again to converge substantially on a constant value that is lower than the trough value.

It is not preferable to acquire the values Is2 and Is3 (see FIG. 8 (D)) of the sensor cell current Is during fluctuation of the sensor cell current Is. Therefore, in the case of making the deterioration determination by temporarily lowering the pump cell voltage Vp, both the timing of acquiring the value Is2 and the timing of acquiring the value Is3 respectively become later than those in the deterioration determination by the deterioration determining unit 16 of the control apparatus 10 according to the present embodiment.

As described above, in the case of making the deterioration determination by temporarily lowering the pump cell voltage Vp, the timings of acquiring the values of the pump cell current Ip, the sensor cell current Is and the monitor cell current Im necessary for the deterioration determination become late. Consequently, it takes a relatively long time to make the deterioration determination. Moreover, when the time required to make the deterioration determination is relatively long, the concentration of nitrogen oxides and/or the concentration of oxygen in the exhaust gas reaching the exhaust gas sensor 100 may change during the deterioration determination. Consequently, due to the change in the concentration of nitrogen oxides and/or the concentration of oxygen in the exhaust gas reaching the exhaust gas sensor 100, the pump cell current Ip, the sensor cell current Is and the monitor cell current Im would be changed, thereby lowering the accuracy of the deterioration determination.

In contrast, in the present embodiment, the deterioration determining unit 16 makes the deterioration determination with the pump cell voltage Vp kept constant. Consequently, it is possible for the deterioration determining unit 16 to accurately make the deterioration determination in a short time without being affected by a capacitor discharge.

Moreover, in the present embodiment, the deterioration determining unit 16 makes the deterioration determination only when all of the pump cell 150, the sensor cell 160 and the monitor cell 170 are determined by the active-state determining unit 15 to be in their respective active states (see step S02 of FIG. 10). Consequently, it is possible to prevent the deterioration determination from being made with at least one of the cells 150-170 being inactive. As a result, it is possible to prevent the accuracy of the deterioration determination from being lowered due to the least one inactive cell.

In the present embodiment, in determining whether or not at least one of the sensor cell 160 and the monitor cell 170 is deteriorated, the deterioration determining unit 16 causes the heater controlling unit 11 to control the output of the heater 180 so as to lower the temperature of the pump cell 150 detected by the cell temperature detecting unit 13 to the preset target temperature (see step S05 of FIG. 10). Consequently, it is possible to sufficiently increase the amount of oxygen flowing through the pump cell 150 to reach the sensor cell 160 or the monitor cell 170, thereby making it possible to accurately determine whether or not at least one of the sensor cell 160 and the monitor cell 170 is deteriorated. Moreover, as described previously, the target temperature is preset so as to keep both the sensor cell 160 and the monitor cell 170 in their respective active states. Consequently, it is possible to prevent both the temperatures of the sensor cell 160 and the monitor cell 170 from being excessively lowered and thus prevent both the sensor cell 160 and the monitor cell 170 from becoming inactive.

In the present embodiment, the deterioration determining unit 16 makes the deterioration determination only when the temperature of the exhaust gas detected by the gas temperature detecting unit 14 is lower than the predetermined upper limit temperature (see step S01 of FIG. 10). Consequently, it is possible to prevent the occurrence of an event where the admittance of the pump cell 150 could not be sufficiently lowered even with reduction in the heater output for the deterioration determination.

In the present embodiment, the deterioration determining unit 16 determines whether or not at least one of the sensor cell 160 and the monitor cell 170 is deteriorated on the basis of ΔIp, ΔIs and ΔIm which respectively represent the amount of change in the pump cell current Ip, the amount of change in the sensor cell current Is and the amount of change in the monitor cell current Im caused by temporarily changing the heater output for the deterioration determination.

Alternatively, provided that ΔIp caused by temporarily changing the heater output for the deterioration determination is always constant, it is possible to determine whether or not the sensor cell 160 is deteriorated based only on ΔIs and determine whether or not the monitor cell 170 is deteriorated based only on ΔIm.

However, the relationship between the temperature of the pump cell 150 and the pump cell current Ip tends to change over time. Therefore, ΔIp caused by temporarily changing the heater output for the deterioration determination is not always constant, but changes over time. Accordingly, in terms of accuracy of the deterioration determination, it is preferable to make the deterioration determination on the basis of ΔIp, ΔIs and ΔIm as in the present embodiment.

Moreover, as described previously, in the present embodiment, in determining whether or not at least one of the sensor cell 160 and the monitor cell 170 is deteriorated, the deterioration determining unit 16 causes the heater controlling unit 11 to reduce the output of the heater 180 and thereby lowers the temperature of the pump cell 150. Alternatively, in determining whether or not at least one of the sensor cell 160 and the monitor cell 170 is deteriorated, the deterioration determining unit 16 may cause the heater controlling unit 11 to increase the output of the heater 180 and thereby increase the temperature of the pump cell 150. Consequently, with the increase in the temperature of the pump cell 150, the amount of oxygen removed by the pump cell 150 from the exhaust gas in the measurement chamber 121 would increase, thus reducing the amount of oxygen flowing through the pump cell 150 to reach the sensor cell 160 or the monitor cell 170. In this case, it is still possible to determine whether or not at least one of the sensor cell 160 and the monitor cell 170 is deteriorated on the basis of ΔIp, ΔIs and ΔIm.

In addition, the amount of oxygen removed by the pump cell 150 during the normal operation of the exhaust gas sensor 100 for measuring the concentration of nitrogen oxides in the exhaust gas (i.e., not for the deterioration determination) is generally set to be as large as possible. Therefore, it may be difficult to further increase, for the purpose of making the deterioration determination, the amount of oxygen removed by the pump cell 150. Hence, in the case of making the deterioration determination by increasing the output of the heater 180 and thereby increasing the temperature of the pump cell 150, it may be necessary to lower the temperature of the pump cell 150 in advance before making the deterioration determination. In view of the above, it is preferable to make the deterioration determination by reducing the output of the heater 180 and thereby lowering the temperature of the pump cell 150 as in the present embodiment.

Second Embodiment

Figure 13:
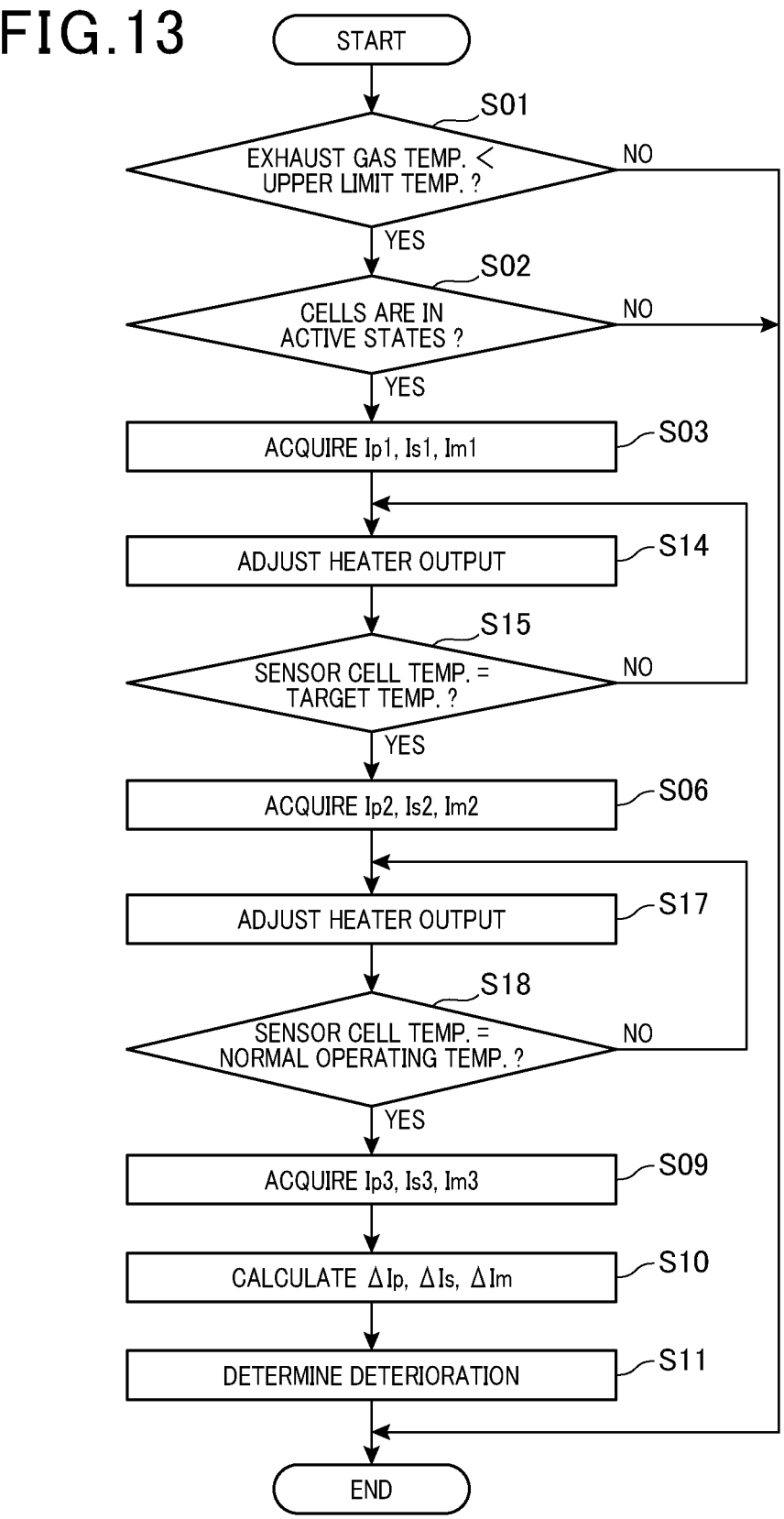
FIG. 13 is a flow chart illustrating a deterioration determining process performed by a deterioration determining unit of a control apparatus according to a second embodiment.

FIG. 13 shows a deterioration determining process performed by a deterioration determining unit 16 of a control apparatus 10 according to the second embodiment.

The deterioration determining process shown in FIG. 13 is similar to the deterioration determining process shown in FIG. 10 and performed by the deterioration determining unit 16 of the control apparatus 10 according to the first embodiment.

More specifically, steps S01-S03, S06 and S09-S11 of the deterioration determining process shown in FIG. 13 are respectively identical to those of the deterioration determining process shown in FIG. 10, whereas steps S14-S15 and S17-S18 of the deterioration determining process shown in FIG. 13 respectively correspond to but are different from steps S04-S05 and S07-S08 of the deterioration determining process shown in FIG. 10. Accordingly, steps S14-S15 and S17-S18 of the deterioration determining process shown in FIG. 13 will be mainly described hereinafter.

In the deterioration determining process shown in FIG. 13, after acquiring the values Ip1, Is1 and Im1 in step S03, in subsequent step S14, the deterioration determining unit 16 causes the heater controlling unit 11 to adjust the output of the heater 180 so as to temporarily lower the temperature of the sensor cell 160. More specifically, in this step, the heater controlling unit 11 adjusts the duty cycle of electric current supplied to the heater 180 so as to reduce the output of the heater 180 from the initial value thereof and thereby decrease the temperature of the sensor cell 160 to a preset target temperature. Here, the target temperature is preset to a low temperature at which the sensor cell 160 can still be kept in its active state.

In step S15, the deterioration determining unit 16 determines whether the temperature of the sensor cell 160 detected by the cell temperature detecting unit 13 has been decreased to the target temperature.

If the determination in step S15 results in a "NO" answer, the process returns to step S14 to repeat steps S14 and S15. In contrast, if the determination in step S15 results in a "YES" answer, the process proceeds to step S06.

Moreover, after acquiring the values Ip2, Is2 and Im2 in step S06, in subsequent step S17, the deterioration determining unit 16 causes the heater controlling unit 11 to adjust the output of the heater 180 so as to increase the temperature of the sensor cell 160 which has been temporarily lowered. More specifically, in this step, the heater controlling unit 11 adjusts the duty cycle of electric current supplied to the heater 180 so as to return (or increase) the output of the heater 180 to the initial value thereof and thereby increase the temperature of the sensor cell 160 to a normal operating temperature. Here, the normal operating temperature is preset to the temperature of the sensor cell 160 during the normal operation of the exhaust gas sensor 100 for measuring the concentration of nitrogen oxides in the exhaust gas (i.e., not for the deterioration determination).

It should be noted that: the temperature of the sensor cell 160 may be detected by the cell temperature detecting unit 13 immediately before step S14; and the normal operating temperature of the sensor cell 160 may be preset to the temperature detected immediately before step S14.

In step S18, the deterioration determining unit 16 determines whether the temperature of the sensor cell 160 detected by the cell temperature detecting unit 13 has been increased to the normal operating temperature.

If the determination in step S18 results in a "NO" answer, the process returns to step S17 to repeat steps S17 and S18. In contrast, if the determination in step S18 results in a "YES" answer, the process proceeds to step S09.

As described above, in the present embodiment, in determining whether or not at least one of the sensor cell 160 and the monitor cell 170 is deteriorated, the deterioration determining unit 16 causes the heater controlling unit 11 to control the output of the heater 180 so as to lower the temperature of the sensor cell 160 detected by the cell temperature detecting unit 13 to the preset target temperature, thereby lowering the temperature of the pump cell 150. That is, in the present embodiment, the temperature of the pump cell 150 is not directly controlled, but lowered as a result of the lowering of the temperature of the sensor cell 160.

According to the present embodiment, it is also possible to achieve the same advantageous effects as described in the first embodiment.

Moreover, according to the present embodiment, it is possible to more reliably prevent the occurrence of an event where the temperature of the sensor cell 160 is excessively lowered to make the sensor cell 160 inactive.

In addition, in an alternative embodiment, in determining whether or not at least one of the sensor cell 160 and the monitor cell 170 is deteriorated, the deterioration determining unit 16 may cause the heater controlling unit 11 to control the output of the heater 180 so as to lower the temperature of the monitor cell 170 detected by the cell temperature detecting unit 13 to a preset target temperature, thereby lowering the temperature of the pump cell 150.

Third Embodiment

Figure 14:
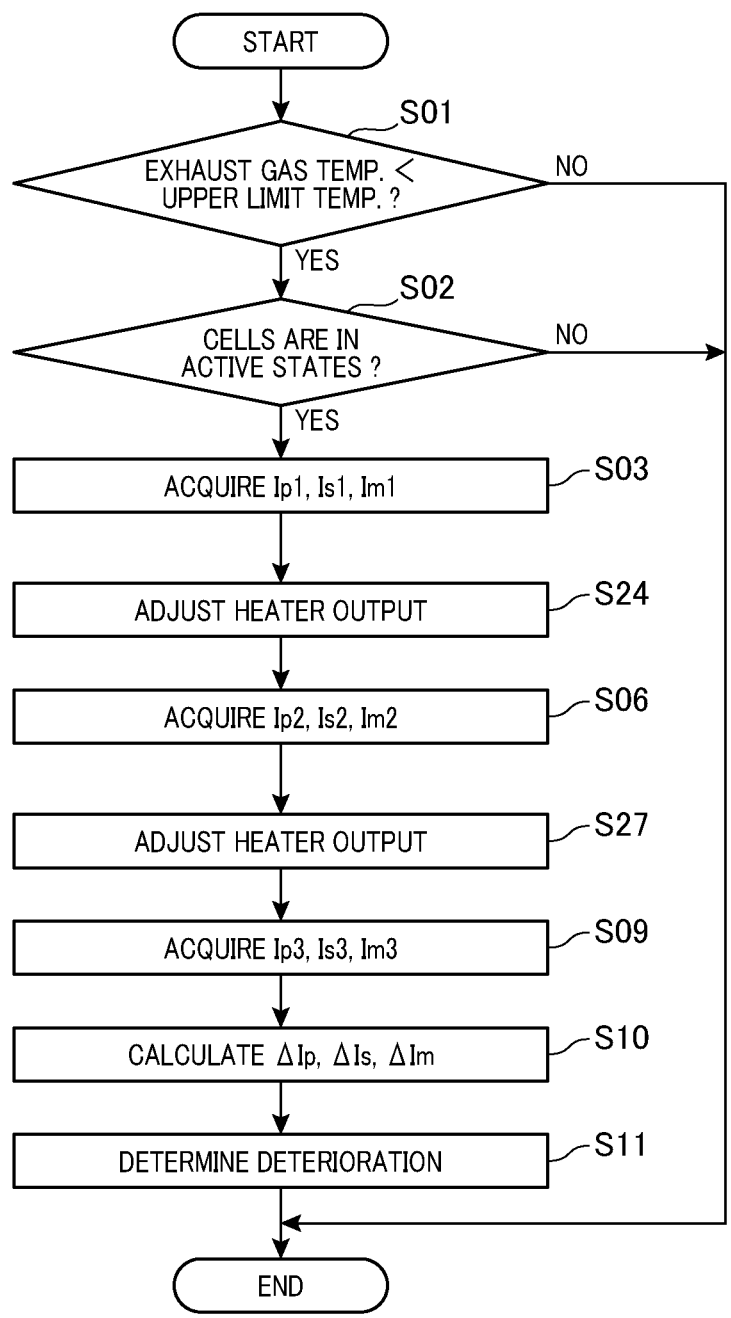
FIG. 14 is a flow chart illustrating a deterioration determining process performed by a deterioration determining unit of a control apparatus according to a third embodiment.

FIG. 14 shows a deterioration determining process performed by a deterioration determining unit 16 of a control apparatus 10 according to the third embodiment.

The deterioration determining process shown in FIG. 14 is similar to the deterioration determining process shown in FIG. 10 and performed by the deterioration determining unit 16 of the control apparatus 10 according to the first embodiment.

More specifically, steps S01-S03, S06 and S09-S11 of the deterioration determining process shown in FIG. 14 are respectively identical to those of the deterioration determining process shown in FIG. 10, whereas steps S24 and S27 of the deterioration determining process shown in FIG. 14 respectively correspond to but are different from steps S04 and S07 of the deterioration determining process shown in FIG. 10. Moreover, the deterioration determining process shown in FIG. 14 includes no steps corresponding to steps S05 and S08 of the deterioration determining process shown in FIG. 10. Accordingly, steps S24 and S27 of the deterioration determining process shown in FIG. 14 will be mainly described hereinafter.

In the deterioration determining process shown in FIG. 14, after acquiring the values Ip1, Is1 and Im1 in step S03, in subsequent step S24, the deterioration determining unit 16 causes the heater controlling unit 11 to adjust the output of the heater 180 so as to temporarily lower the temperature of the pump cell 150. More specifically, in this step, the heater controlling unit 11 reduces the duty cycle of electric current supplied to the heater 180 from an initial value thereof to a preset target value, thereby reducing the output of the heater 180 and lowering the temperature of the pump cell 150. Here, the target value is preset to a low value at which all of the pump cell 150, the sensor cell 160 and the monitor cell 170 can still be kept in their respective active states.

That is, in the present embodiment, none of the temperatures of the pump cell 150, the sensor cell 160 and the monitor cell 170 is directly controlled; instead, all of the temperatures of the pump cell 150, the sensor cell 160 and the monitor cell 170 are lowered as a result of the reduction in the duty cycle of electric current supplied to the heater 180.

After a first predetermined time has elapsed from the execution of step S24, the process proceeds to step S06. Here, the first predetermined time is previously determined as a time required for the temperatures of the pump cell 150, the sensor cell 160 and the monitor cell 170 to be lowered and substantially converge on their respective constant values.

Moreover, after acquiring the values Ip2, Is2 and Im2 in step S06, in subsequent step S27, the deterioration determining unit 16 causes the heater controlling unit 11 to adjust the output of the heater 180 so as to increase the temperature of the pump cell 150 which has been temporarily lowered. More specifically, in this step, the heater controlling unit 11 returns (or increases) the duty cycle of electric current supplied to the heater 180 to the initial value thereof, thereby returning (or increasing) the output of the heater 180 to the initial value thereof and increasing the temperature of the pump cell 150.

After a second predetermined time has elapsed from the execution of step S27, the process proceeds to step S09. Here, the second predetermined time is previously determined as a time required for the temperatures of the pump cell 150, the sensor cell 160 and the monitor cell 170 to be increased and substantially converge on their respective constant values.

As described above, in the present embodiment, in determining whether or not at least one of the sensor cell 160 and the monitor cell 170 is deteriorated, the deterioration determining unit 16 causes the heater controlling unit 11 to reduce the duty cycle of electric current supplied to the heater 180 from the initial value thereof to the preset target value, thereby reducing the output of the heater 180. As a result, the temperature of the pump cell 150 is temporarily changed.

According to the present embodiment, it is also possible to achieve the same advantageous effects as described in the first embodiment.

Moreover, according to the present embodiment, it is possible to simplify the deterioration determining process performed by the deterioration determining unit 16.

Fourth Embodiment

Figure 15:
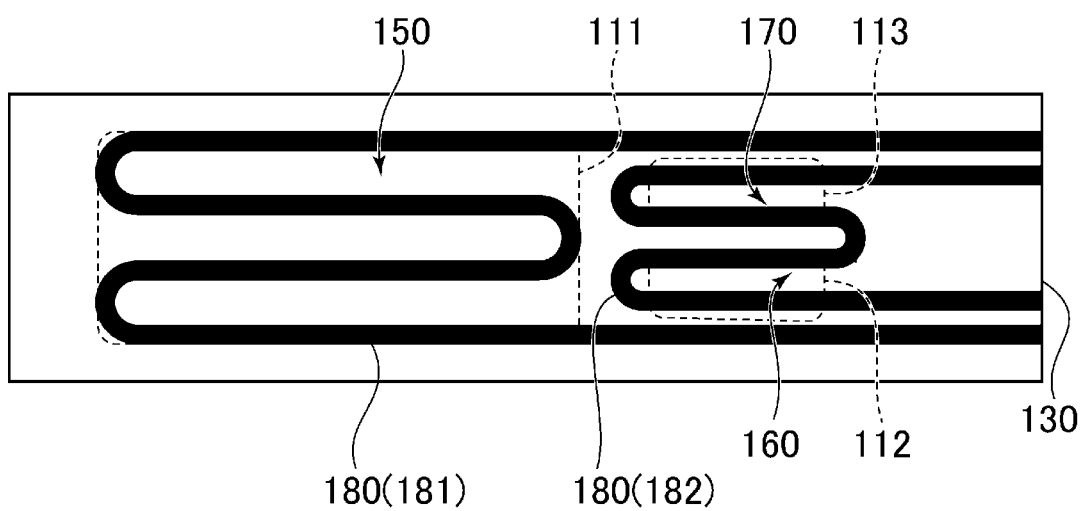
FIG. 15 is a schematic diagram illustrating the arrangement of a heater in an exhaust gas sensor according to a fourth embodiment.

FIG. 15 shows the arrangement of a heater 180 in an exhaust gas sensor 100 according to the fourth embodiment.

As shown in FIG. 15, in the present embodiment, the heater 180 is comprised of a first heater 181 and a second heater 182 that are formed separately from each other.

Specifically, the first heater 181 is identical to the heater 180 described in the first embodiment with reference to FIG. 5. That is, the first heater 181 is formed in such a pattern as to mainly heat the pump cell 150 (or the first cell) among the three cells 150-170 of the exhaust gas sensor 100.

On the other hand, the second heater 182 is provided to heat the sensor cell 160 and the monitor cell 170 (or the second cells). That is, the second heater 182 is formed in such a pattern as to mainly heat the sensor cell 160 and the monitor cell 170.

Moreover, a control apparatus 10 according to the present embodiment includes a heater controlling unit 11 that controls the output of the first heater 181 and the output of the second heater 182 individually. More specifically, the heater controlling unit 11 individually controls the duty of electric current supplied to the first heater 181 and the duty of electric current supplied to the second heater 182.

Furthermore, a deterioration determining unit 16 of the control apparatus 10 according to the present embodiment performs a deterioration determining process that differs from the deterioration determining process shown in FIG. 10 only in step S04 and S07.

Specifically, in the present embodiment, in step S04 of the deterioration determining process, the deterioration determining unit 16 causes the heater controlling unit 11 to reduce the output of the first heater 181 and thereby lower the temperature of the pump cell 150 while controlling the output of the second heater 182 so as to keep the temperature of the sensor cell 160 at a predetermined temperature (e.g., at the temperature of the sensor cell 160 at the start of the deterioration determination). More specifically, the heater controlling unit 11 reduces the output of the first heater 181 with the temperature of the pump cell 150 detected by the cell temperature detecting unit 13 being fed back to the heater controlling unit 11. At the same time, the heater controlling unit 11 controls the output of the second heater 182 with the temperature of the sensor cell 160 detected by the cell temperature detecting unit 13 being fed back to the heater controlling unit 11.

Moreover, in the present embodiment, in step S07 of the deterioration determining process, the deterioration determining unit 16 causes the heater controlling unit 11 to increase the output of the first heater 181 and thereby increase the temperature of the pump cell 150 while controlling the output of the second heater 182 so as to keep the temperature of the sensor cell 160 at the predetermined temperature. More specifically, the heater controlling unit 11 increases the output of the first heater 181 with the temperature of the pump cell 150 detected by the cell temperature detecting unit 13 being fed back to the heater controlling unit 11. At the same time, the heater controlling unit 11 controls the output of the second heater 182 with the temperature of the sensor cell 160 detected by the cell temperature detecting unit 13 being fed back to the heater controlling unit 11.

According to the present embodiment, it is also possible to achieve the same advantageous effects as described in the first embodiment.

Moreover, according to the present embodiment, in making the deterioration determination, it is possible to temporarily change the temperature of the pump cell 150 while keeping the temperature of the sensor cell 160 constant at the predetermined temperature. Consequently, it is possible to accurately make the deterioration determination while reliably keeping the sensor cell 160 in the active state thereof.

While the above particular embodiments have been shown and described, it will be understood by those skilled in the art that various modifications, changes, and improvements may be made without departing from the spirit of the present disclosure.

For example, the control apparatuses 10 according to the above-described embodiments are provided to control the exhaust gas sensor 100 in which both the pump cell 150 and the sensor cell 160 are formed on the same solid electrolyte body 110 (see FIG. 2). Alternatively, the control apparatuses 10 can also be applied to exhaust gas sensors having different configurations from the exhaust gas sensor 100, such as the one disclosed in Japanese Patent Application Publication No. JP2008170341A in which a pump cell and a sensor cell are respectively formed on two separate solid electrolyte bodies.

What is claimed is:

1. A control apparatus for an exhaust gas sensor, the exhaust gas sensor comprising: a first cell configured to remove oxygen from exhaust gas of an internal combustion engine; a second cell configured to output electric current depending on concentration of a measurement target component in the exhaust gas from which oxygen has been removed by the first cell; and a heater configured to heat both the first and second cells, the control apparatus comprising:

a computer processor and storage memory for storing instructions which upon execution by the computer processor configures the control apparatus to at least perform:
a heater control to control output of the heater;
a current detection to detect the electric current outputted from the second cell; and
a deterioration determination, wherein the deterioration determination is configured to:
cause the heater control to change the output of the heater for determining deterioration of the second cell and thereby change temperature of the first cell; and
intentionally determine, during the change in the output of the heater caused for determining deterioration of the second cell, whether or not the second cell is deteriorated on the basis of an amount of change in the electric current outputted from the second cell and detected by the current detection,
the amount of change in the electric current being caused by the change in the output of the heater and thus the change in the temperature of the first cell.

2. The control apparatus as set forth in claim 1, wherein the deterioration determination is configured to:
cause the heater control to temporarily reduce the output of the heater and thereby temporarily lower the temperature of the first cell; and
determine, during the temporary reduction in the output of the heater, whether or not the second cell is deteriorated on the basis of the amount of change in the electric current outputted from the second cell and detected by the current detection.

3. The control apparatus as set forth in claim 1, further comprising a cell temperature detection configured to detect the temperature of the first cell,
wherein
in determining whether or not the second cell is deteriorated, the deterioration determination causes the heater control to control the output of the heater so as to change the temperature of the first cell detected by the cell temperature detection to a preset target temperature.

4. The control apparatus as set forth in claim 1, further comprising a cell temperature detection configured to detect temperature of the second cell,
wherein
in determining whether or not the second cell is deteriorated, the deterioration determination causes the heater control to control the output of the heater so as to change the temperature of the second cell detected by the cell temperature detection to a preset target temperature, thereby changing the temperature of the first cell.

5. The control apparatus as set forth in claim 1, wherein the current detection is configured to also detect electric current outputted from the first cell, and
the deterioration determination is configured to determine, during the change in the output of the heater, whether or not the second cell is deteriorated on the basis of both an amount of change in the electric current outputted from the first cell and detected by the current detection and the amount of change in the electric current outputted from the second cell and detected by the current detection.

6. The control apparatus as set forth in claim 1, further comprising an active-state determination configured to determine whether or not both the first and second cells are in respective active states thereof,
wherein
the deterioration determination is configured to determine, only when both the first and second cells are determined by the active-state determination to be in the respective active states thereof, whether or not the second cell is deteriorated.

7. The control apparatus as set forth in claim 6, further comprising a cell temperature detection configured to detect temperature of one of the first and second cells,
wherein
the active-state determination is configured to determine, when the temperature of the one of the first and second cells detected by the cell temperature detection is higher than a predetermined activation temperature, that both the first and second cells are in the respective active states thereof.

8. The control apparatus as set forth in claim 1, further comprising a gas temperature detection configured to detect temperature of the exhaust gas,
wherein
the deterioration determination is configured to determine, only when the temperature of the exhaust gas detected by the gas temperature detection is lower than a predetermined upper limit temperature, whether or not the second cell is deteriorated.

9. The control apparatus as set forth in claim 1, wherein the heater comprises a first heater configured to heat the first cell and a second heater configured to heat the second cell, and
in determining whether or not the second cell is deteriorated, the deterioration determination causes the heater control to change output of the first heater and thereby change the temperature of the first cell while controlling output of the second heater to keep temperature of the second cell at a predetermined temperature.

10. The control apparatus as set forth in claim 1, wherein the change in temperature of the first cell, caused by the change in the output of the heater, causes a change an amount of oxygen flowing through the first cell to the second cell.

* * * * *

UNITED STATES PATENT AND TRADEMARK OFFICE
CERTIFICATE OF CORRECTION

PATENT NO. : 10,731,588 B2
APPLICATION NO. : 16/178858
DATED : August 4, 2020
INVENTOR(S) : Murayama et al.

Page 1 of 1

It is certified that error appears in the above-identified patent and that said Letters Patent is hereby corrected as shown below:

On the Title Page

Item "* Notice" delete the following Lines 4-5:
"This patent is subject to a terminal disclaimer."

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*